United States Patent
Hoover et al.

(10) Patent No.: US 11,104,454 B2
(45) Date of Patent: Aug. 31, 2021

(54) SYSTEM AND METHOD FOR CONVERTING TECHNICAL MANUALS FOR AUGMENTED REALITY

(71) Applicant: THE BOEING COMPANY, Chicago, IL (US)

(72) Inventors: Taylor J. Hoover, Norwood, PA (US); Keith W. Grauer, Media, PA (US); Michael C. DiLucca, Devon, PA (US)

(73) Assignee: THE BOEING COMPANY, Chicago, IL (US)

( * ) Notice: Subject to any disclaimer, the term of this patent is extended or adjusted under 35 U.S.C. 154(b) by 122 days.

(21) Appl. No.: 16/140,187

(22) Filed: Sep. 24, 2018

(65) Prior Publication Data
US 2020/0094992 A1 Mar. 26, 2020

(51) Int. Cl.
*B64F 5/40* (2017.01)
*G06K 9/00* (2006.01)
*G06T 19/00* (2011.01)
*G02B 27/01* (2006.01)

(52) U.S. Cl.
CPC .............. *B64F 5/40* (2017.01); *G02B 27/017* (2013.01); *G06K 9/00469* (2013.01); *G06K 9/00671* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 2007/0160067 A1* | 7/2007 | Hayward | G06F 16/258 370/397 |
| 2012/0007852 A1* | 1/2012 | Morate | G06T 19/006 345/419 |
| 2013/0010068 A1* | 1/2013 | Tiernan | G06K 9/228 348/46 |
| 2018/0315248 A1* | 11/2018 | Bastov | G06T 19/006 |

(Continued)

OTHER PUBLICATIONS

Scurati et al. "Converting Maintenance Actions into Standard Symbols for Augmented Reality Applications in Industry 4.0", Mar. 2018 (Year: 2018).*

(Continued)

*Primary Examiner* — Hilina K Demeter
(74) *Attorney, Agent, or Firm* — Moore IP Law

(57) ABSTRACT

An apparatus includes a head mounted display (HMD) configured to generate sensor data indicative of user inputs. The apparatus further includes a processor configured to communicate with the HMD and a memory coupled to the processor. The memory stores instructions that, when executed by the processor, cause the processor to obtain a data package including technical manual data and one or more visual representations. The instructions also cause the processor to categorize the technical manual data of the data package based on content and formatting of the technical manual data. The instructions cause the processor to select a particular parser based on a categorization of the technical manual data. The instructions further cause the processor to parse, by the particular parser, the technical manual data to convert the technical manual data into converted technical manual data and to generate a data analytics object based on the converted technical manual data.

20 Claims, 20 Drawing Sheets

(56) References Cited

U.S. PATENT DOCUMENTS

2019/0057548 A1* 2/2019 Singh .................. G06K 9/6263

OTHER PUBLICATIONS

Gattullo et al. "From paper manual to AR manual: do we still need text?", Jun. 2017 (Year: 2017).*
Gattullo et al., "From paper manual to AR manual: do we still need text?", NPL Jul. 2017 (Year: 2017).*
Scurati et al. "Converting Maintenance Actions into Standard Symbols for Augmented Reality Applications in Industry 4.0" (Year: 2018).*
Li et al. "Instruction Manual for Product Assembly Process Based on Augmented Visualization" (Year: 2018).*
Zhu et al. "AR-Mentor: Augmented Reality Based Mentoring System" (Year: 2014).*
"Intelligent Aircraft Maintenance-Kingsee AR Smartglasses Performance Support System (PSS)," YouTube, www.youtube.comwatchv=zP_5Z1A9Pcw, retrieved Sep. 24, 2018.
Oglass, Shenzhen Augmented Reality Technology Co., Ltd., 2017, Oglass Company Info V2.4.4, 27 pgs.

* cited by examiner

```
<MAINFUNC>
  <FIGURE BHID='W5776442'>
    <TITLE>Figure 1. External Electric Power Application</TITLE>
    <GRAPHIC BOARDNO='a142809' REPROWID='40' REPRODEP='51'>
  </FIGURE>
  <STEP1 BHID='W5776443'>
    <PARA BHID="W5776444">Connect the external electrical power.</PARA>
    <STEP2 BHID='W8474569'>
      <SPECPARA><CAUTION><PARA BHID="W8474664">
        RF radiation hazards exist to personnel working within 8 meters of the antennas.
      </PARA></CAUTION>
      <PARA BHID='W8474570'>
        On the No. 1 Power Distribution Panel (PDP), open the circuit breakers listed below:
      </PARA></SPECPARA>
      <STEP3 BHID='W8474571'>
        <PARA BHID='W8474572'>
          RAD ALT (A11)
        </PARA>
      </STEP3>
      <STEP3 BHID='W8474573'>
        <PARA BHID='W8474574'>
          RAD ALT AUDIO WARN (A10)
        </PARA>
      </STEP3>
    </STEP2>
    <STEP2 BHID='W8474575'>
      <SPECPARA><CAUTION><PARA BHID='W8474665'>
        IR radiation hazards exist to personnel working within 4 meters of the antennas.
      </PARA></CAUTION>
      <PARA BHID='W8474666'>
        On the No. 2 PDP open the ICRM (D32) circuit breaker.
      </PARA></SPECPARA>
    </STEP2>
  </STEP1>
</MAINFUNC>
```

| TASK LOG DATA | | | | | |
|---|---|---|---|---|---|
| USER ID | TIMESTAMP | PROFICIENCY | TASK ID | TASK NAME | DIFFICULTY LEVEL | VERSION |
| 1432.20 | 8/13/2018 01:42:34 PM | NOVICE | 01562103 | FUEL LINE INT | 7 | 2.0.2.2 |
| 1432.20 | 8/13/2018 01:43:11 PM | NOVICE | 95321565 | WIPER CHK | 8 | 2.0.2.2 |
| 6841.20 | 8/14/2018 10:31:14 PM | NOVICE | 48597448 | PWR STP CHK | 2 | 2.0.2.3 |
| 6841.20 | 8/14/2018 10:31:58 PM | NOVICE | 53210238 | LNDG NS CMPT | 6 | 2.0.2.3 |
| 4550.21 | 8/14/2018 12:08:12 PM | EXPERT | 01523015 | W439 CONT CHK | 3 | 2.0.2.3 |
| 4550.21 | 8/14/2018 12:09:01 PM | EXPERT | 61485230 | W569 CONT CHK | 3 | 2.0.2.3 |
| 4550.21 | 8/14/2018 12:09:34 PM | EXPERT | 85465421 | W575 CONT CHK | 3 | 2.0.2.3 |
| 4550.21 | 8/14/2018 12:10:01 PM | EXPERT | 41216884 | OH PDP SW50 | 2 | 2.0.2.3 |

SYSTEM AND METHOD FOR CONVERTING TECHNICAL MANUALS FOR AUGMENTED REALITY

FIELD OF THE DISCLOSURE

The present disclosure is generally related to augmented reality and converting technical manuals for use with augmented reality systems.

BACKGROUND

Complex systems are often associated with technical manuals that include content to maintain and repair the complex systems. The technical manuals are used by maintenance technicians to repair, maintain, and update the systems. Current methods of delivering technical manual content require extensive setup (via print-outs) or additional bulky equipment (e.g., ruggedized computers). Additionally, technician knowledge and experience is lost as technicians change jobs or retire, and technician knowledge is not passed between sites or locations. Furthermore, the technical manuals are not easily updateable by technicians, and no data analytics is captured with regards to the technical manuals. These problems create a challenging learning curve, a lower quality of work, and increased system downtime during scheduled and unscheduled maintenance.

SUMMARY

In a particular implementation, an apparatus includes a head mounted display (HMD) configured to generate sensor data indicative of user inputs. The apparatus further includes a processor configured to communicate with the HMD and a memory coupled to the processor. The memory stores instructions that, when executed by the processor, cause the processor to obtain a data package including technical manual data and one or more visual representations. The instructions also cause the processor to categorize the technical manual data of the data package based on content and formatting of the technical manual data. The instructions cause the processor to select a particular parser from a plurality of parsers based on a categorization of the technical manual data. The instructions further cause the processor to parse, by the particular parser, the technical manual data to convert the technical manual data into converted technical manual data and to generate a data analytics object based on the converted technical manual data.

In another particular implementation, a method includes obtaining, by a processor, a data package including technical manual data and one or more visual representations. The method also includes categorizing, by the processor, the technical manual data of the data package based on content and formatting of the technical manual data. The method also includes selecting, by the processor, a particular parser from a plurality of parsers based on a categorization of the technical manual data. The method further includes parsing, by the particular parser, the technical manual data to convert the technical manual data into converted technical manual data and to generate a data analytics object based on the converted technical manual data.

In yet another particular implementation, a computer-readable storage device includes instructions, that when executed, cause a processor to perform operations including obtaining a data package including technical manual data and one or more visual representations. The instructions also cause the processor to perform operations of categorizing the technical manual data of the data package based on content and formatting of the technical manual data. The instructions also cause the processor to perform operations of selecting a particular parser from a plurality of parsers based on a categorization of the technical manual data. The instructions further cause the processor to perform operations of parsing, by the particular parser, the technical manual data to convert the technical manual data into converted technical manual data and to generate a data analytics object based on the converted technical manual data.

By converting the technical manual data, the technical manual data can be displayed by an augmented reality device, and a technician can perform maintenance without bulky equipment or stacks of printed material. Additionally, by generating a data analytics object, maintenance metrics are linked with the technical manuals and technician performance can be tracked. Additionally, maintenance information from technicians can be associated with the technical manuals and shared with other technicians.

BRIEF DESCRIPTION OF THE DRAWINGS

FIG. 4 is a flow chart of an example of a method conversion and extraction flow;

FIG. 5 is a diagram that illustrates an example of a data analytics object;

DETAILED DESCRIPTION

The disclosed embodiments provide systems and methods for converting technical manuals for display with augmented reality (AR) devices. The system includes an AR device that obtains technical manual data from a technical manual database. The technical manual database can be hosted by a main database (e.g., a central server hosted remotely) or a local computer (e.g., an on-site database). The AR device converts the technical manual data for display (e.g., as part of an augmented reality display or a virtual reality display) and displays content of the technical manual as the user is performing the tasks. The AR device also receives or retrieves visuals associated with the technical manuals and modifies or converts the visuals for display (e.g., as part of the augmented reality display or the virtual reality display). For example, the AR device may layer or insert the content of the technical manuals and the visuals on top of (in the foreground of) the real world.

The AR device responds to user gestures (e.g., hand and head gestures) and voice commands to progress through the technical manual and the associated tasks. Thus, a technician can perform a task without using extensive print-outs and bulky equipment, and the technician does not have to search or stop working to obtain more information. The AR device also enables the technician to capture notes, propose modifications, and capture images while performing tasks.

The AR device also generates a data analytics object during the conversion of the technical manual data. The data analytics object is used for tracking maintenance metrics, such as speed, proficiency, etc. As the technician progresses through a particular maintenance module, the AR device generates timestamps as the technician begins and finishes procedures and tasks of the particular maintenance module. The timestamps are added or inserted into the data analytics object and can be used to track performance of the technician and the accuracy of the technical manual data for the particular maintenance module. Additionally, the timestamps can be used to estimate completion times for performing a task (e.g., end time or duration).

Accordingly, a technician can perform maintenance without bulky equipment or stacks of printed material and can obtain the pertinent information by voice commands and gestures. Additionally, by generating a data analytics object, maintenance metrics are linked with the technical manuals and technician performance can be tracked. Additionally, maintenance information (e.g., user-defined notes) from technicians can be associated with the technical manuals and shared with other technicians.

Figure 1:
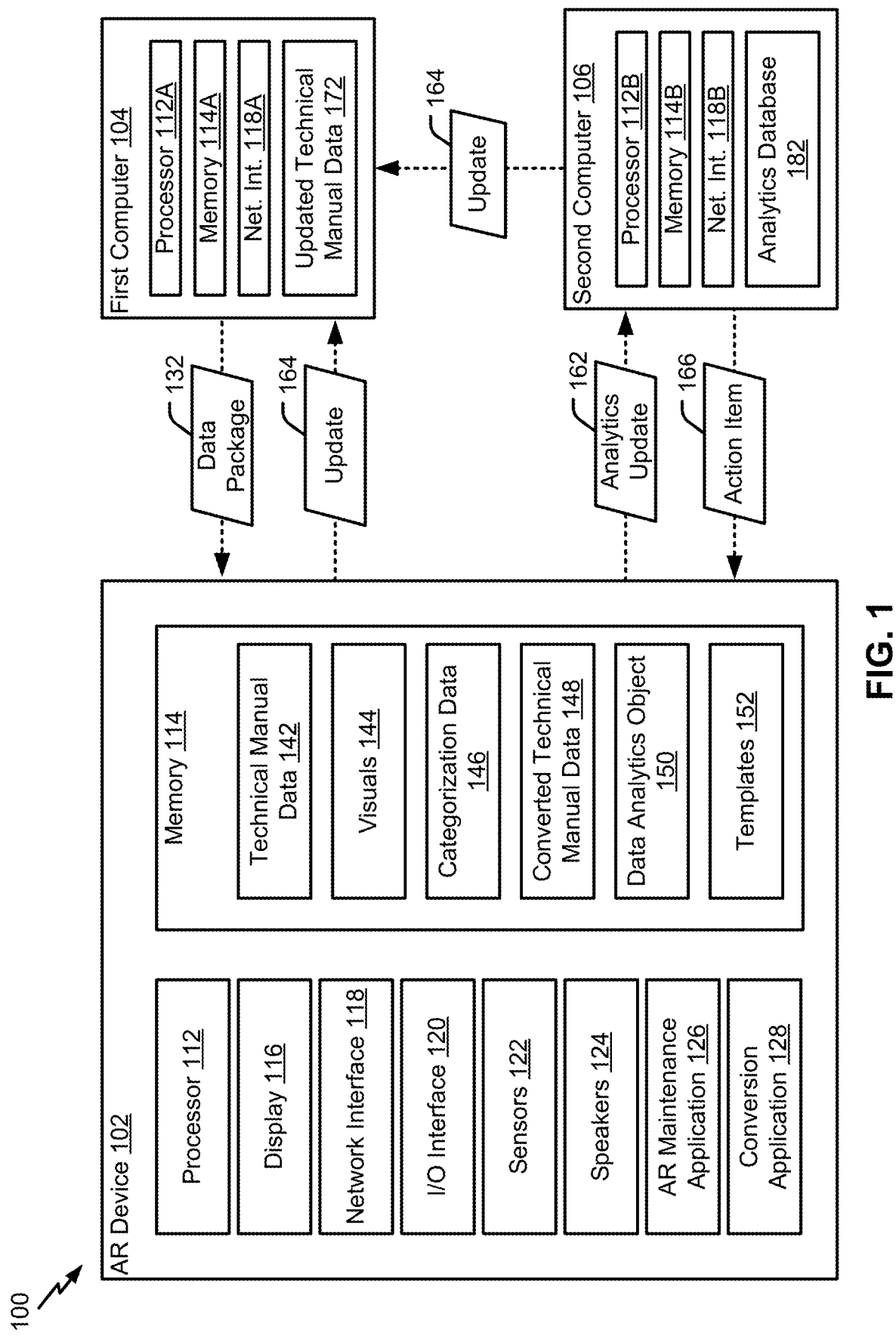
FIG. 1 is a block diagram that illustrates an example a system for converting technical manual data.

FIG. 1 illustrates a block diagram of an example of a system 100 for converting technical manual data 142. The system 100 includes an augmented reality (AR) device 102, a first computer 104, and a second computer 106. The AR device 102 may include or correspond to an AR headset or AR glasses.

The AR device 102 includes a processor 112, a memory 114, a display 116, a network interface 118, an input/output (I/O) interface 120, sensors 122, an AR maintenance application 126, and a technical manual conversion application 128. The processor 112 is coupled to the memory 114 and is configured to execute instructions stored in the memory 114.

The display 116 is a head mounted display (HMD) and is configured to output a graphical user interface (GUI) responsive to signals generated by the processor 112 and/or a graphics processing unit (GPU) thereof (not shown). In some implementations, the display 116 corresponds to a projector and lenses of the AR device 102. To illustrate, the projector outputs (e.g., projects) an image of the GUI onto the lenses of the AR device 102. As an illustrative, non-limiting example, the display 116 includes a waveguide display. Alternatively, the lenses include a display (e.g., a liquid crystal display (LCD), a light-emitting diode (LED) display, an organic LED (OLED) display, etc.) to output the GUI. The network interface 118 includes or corresponds to a wired networking interface, a wireless networking interface, or a combination thereof, and is configured to communicate with other devices, such as the first computer 104, the second computer 106, or both, directly or via a network.

The sensors 122 are configured to generate sensor data, which is used by the AR device 102 and the AR maintenance application 126 to generate and update the GUI. The sensors 122 include one or more of an inertial measurement unit (IMU), a camera, an eye tracker, a microphone, or a combination thereof. The IMU includes one or more gyroscopes, accelerometers, magnetometers, or a combination thereof, and is configured to generate sensor data that indicates user movement, gestures (e.g., head gestures, hand gestures, etc.), or a combination thereof.

The camera is configured to track a view of a user and generate sensor data that indicates where the user is looking, what the user is looking at, or a both. In some implementations, the camera sensor data can enable the AR maintenance application 126 to overlay visual representation 144 on top of real world objects, to overlay text and the visual representations such that the text and the visual representations 144 do not obstruct the user's view of the object or working area. The eye tracker is configured to track a user gaze and eye movement and generate sensor data that indicates the user gaze and eye movement.

The microphone is configured to receive user audio inputs (e.g., voice commands) and is configured to generate sensor data indicative of the audio inputs. The microphone sensor data can enable the device 102 and the AR maintenance application 126 to generate and update the GUI responsive to user voice commands. In some implementations, the microphone corresponds to a microphone array.

In some implementations, the AR device 102 further includes speakers 124. The speakers 124 are configured to output audio indications (e.g., warnings or notifications) and content of the technical manuals to the user. For example, the AR device 102 converts text of the technical manuals to speech and outputs the speech (e.g., module instructions) to the user via the speakers 124. Accordingly, the user can hear instructions, warnings, and notifications without having to look away from the working area.

The AR maintenance application 126 is configured to generate and update a GUI displayed by the display 116. Additionally, the AR maintenance application 126 is configured to generate and update a data analytics object 150, as further described herein.

The conversion application 128 is configured to determine a data type of the technical manual data 142, categorize the technical manual data 142 based on the data type, and convert the technical manual data 142 to generate converted technical manual data 148. The converted technical manual data 148 is configured to be displayed by the AR maintenance application 126. In a particular implementation, the converted technical manual data 148 corresponds to an XML file and is configured to be displayed by the AR device 102. The conversion application 128 and operation thereof is described further with reference to FIG. 2.

The first computer 104 includes a processor 112A, a memory 114A, and a network interface 118A. The first computer 104 is configured to provide data packages 132, including technical manual data 142 and visual representations 144, to the AR device 102. The visual representations 144 include two-dimensional images of an object, three-dimensional model data of the object, or a combination thereof.

The first computer 104 is further configured to receive update messages 164 from the AR device 102. The update messages 164 include updates to the technical manual data 142 from a user or users of the AR device 102. The updates can include or correspond to user notes, user correction suggestions, user addition suggestions, or a combination thereof. The first computer 104 is configured to update the technical manual data 142 based on the update message 164. In some implementations, a user associated with the first computer 104 reviews and approves the updates before the first computer 104 updates the technical manual data 142 to generate updated technical manual data 172 (e.g., second technical manual data). As an illustrative, non-limiting example, the first computer 104 is a technical manual server or database.

The second computer 106 includes a processor 112B, a memory 114B, and a network interface 118B. The second computer 106 is configured to receive analytics updates 162 from the AR device 102. The second computer 106 is configured to update analytics database 182 based on the analytics updates 162. In some implementations, the second computer 106 is configured to generate action items 166 based on the analytics updates 162, the analytics database 182, or a combination thereof. The second computer 106 is configured to send the action item 166 to the AR device 102, the first computer 104, one or more AR devices 102, or a combination thereof. For example, the second computer 106 sends a first action item 166 to the AR device 102 to suggest that a particular user perform a remediation task. The remediation task (or remediation action) may include additional training, supervisor assistance, redoing a previous task, etc. Additionally, the second computer 106 may predict component or part failure based on the analytics update 162. For example, the second computer 106 may use prediction methods or artificial intelligence methods to analyze the analytics update 162 and predict component or part failure. To illustrate, camera sensor data captured during an inspect procedure, user notes, a wear level field in the data analytics object 150, or a combination thereof, in the analytics update 162 can be utilized by the second computer 106 to predict component or part failure. In such implementations, the remediation task (or remediation action) corresponds to adding one or more items to a user maintenance or task queue, e.g., inspect and/or replace a component or part type.

As another example, the second computer 106 sends a second action item to update a difficulty level and/or an estimated duration of a particular task of a particular technical manual. As an illustrative non-limiting example, the second computer 106 is an analytics data server or database. In such implementations, second computer 106 receives analytics updates 162 from multiple AR devices 102. Although the system 100 includes the first computer 104 separate from the second computer 106, in other implementations the system 100 does not include a separate second computer 106 and the first computer 104 stores the technical manual data 142, the updated technical manual data 172, and the analytics database 182. Thus, in such implementations, the first computer 104 performs the functions of the first computer 104 and the second computer 106 described above.

Additionally, the second computer 106 is further configured to send update messages 164 to the first computer 104. The update messages 164 include updates to the technical manual data 142 based on the analytics database 182. For example, a user of the AR device 102 performs a particular task, and the AR device 102 sends the analytics updates 162 to the second computer 106 generated based on the particular task. The second computer 106 updates the analytics database 182 based on the analytics updates 162, and the second computer 106 generates and sends an update message 164 to the first computer 104 based on the updated analytics database 182. As an illustrative, non-limiting example, the update message 164 includes an estimated duration update for the particular task.

During operation of the AR device 102, the AR device 102 obtains the data package 132 including the technical manual data 142 and the visual representations 144 from the first computer 104. The AR device 102 categorizes the technical manual data 142 of the data package 132 based on content and formatting of the technical manual data, as further described with reference to FIGS. 2 and 4. For example, the conversion application 128 of the AR device 102 generates categorization data 146 indicating a categorization (e.g., data type or format) of the technical manual data 142.

The AR device 102 selects a particular parser from a plurality of parsers based on the categorization of the technical manual data 142 indicated by the categorization data 146. The particular parser parses the technical manual data 142 to convert the technical manual data 142 into converted technical manual data 148 and to generate the data analytics object 150 based on the converted technical manual data 148. In some implementations, the data analytics object 150 is a data structure for tracking metrics of maintenance associated with the technical manual data 142 or the converted technical manual data 148. The data structure includes a plurality of task IDs, and each task ID is associated with a particular task of the technical manual data 142 or the converted technical manual data 148.

The AR device 102 generates a GUI responsive to a user selecting the converted technical manual data 148 for display. For example, the AR maintenance application 126 generates the GUI based on the converted technical manual data 148, the visual representations 144, and templates 152. To illustrate, the AR maintenance application 126 selects a particular template 152 from the templates 152 based on user inputs and the converted technical manual data 148. The AR maintenance application 126 populates the particular template 152 based on the converted technical manual data 148 and the visual representations 144. For example, the AR maintenance application 126 inserts a particular visual representation 144 of a component into a first portion of a frame of the GUI and inserts text corresponding to a maintenance step into a second portion of the frame. In a particular implementation, the AR maintenance application 126 inserts a three-dimensional model of a component into a first portion of the frame, inserts text corresponding to a maintenance step associated with the component into a second portion of the frame, and inserts a two-dimensional image of the component into a third portion of the frame. Operations of the AR maintenance application 126 is further described with reference to FIGS. 6-18.

Additionally, the AR device 102 is configured to generate notes and suggested modifications to the technical manuals. For example, the AR maintenance application 126 generates note data based on user inputs (e.g., audio inputs). The note data indicates modifications to instructions of a particular task or step of the technical manual data 142, the converted technical manual data 148, or both. The AR device 102 (e.g., the processor 112 thereof) initiates transmission of an update message 164 to the first computer 104 via the network interface 118. The update message 164 includes the note data and is configured to cause the first computer 104 to update or annotate the technical manual data 142 to generate updated technical manual data 172 (e.g., second technical manual data). The updated technical manual data 172 is then sent to AR devices 102. For example, the updated technical manual data 172 can be pushed to the AR devices 102 or the updated technical manual data 172 can be retrieved by the AR devices 102.

Furthermore, the AR device 102 is configured to update the data analytics object 150. For example, the display 116 (e.g., the HMD) displays first task information associated with a particular task of the converted technical manual data 148 responsive to a first user action. The particular task has a first task ID that is automatically assigned by the conversion application 128. The processor 112 stores, at the data analytics object 150, a first timestamp responsive to displaying the first task information. The first timestamp is associated with the first task ID, the user ID, or a combination thereof. Responsive to receiving a second user input to advance to second task information associated with the particular task, the display 116 displays the second task information. The processor 112 stores, at the data analytics object 150, a second timestamp responsive to displaying the second task information. The second timestamp is associated with the first task ID, the user ID, or a combination thereof. The AR device generates an analytics update 162 based on the updated data analytics object 150. The analytics update 162 is configured to cause the second computer 106 to update the analytics database 182 and to generate an action item 166 based on the updated analytics database. The action item 166 is then sent to AR device 102 by the second computer 106. The AR device 102 generates a notification for the user based on the action item 166. For example, the AR device 102 inserts the notification into the GUI or outputs the notification via speakers, such as the speakers 124 of FIG. 1.

Figure 2:
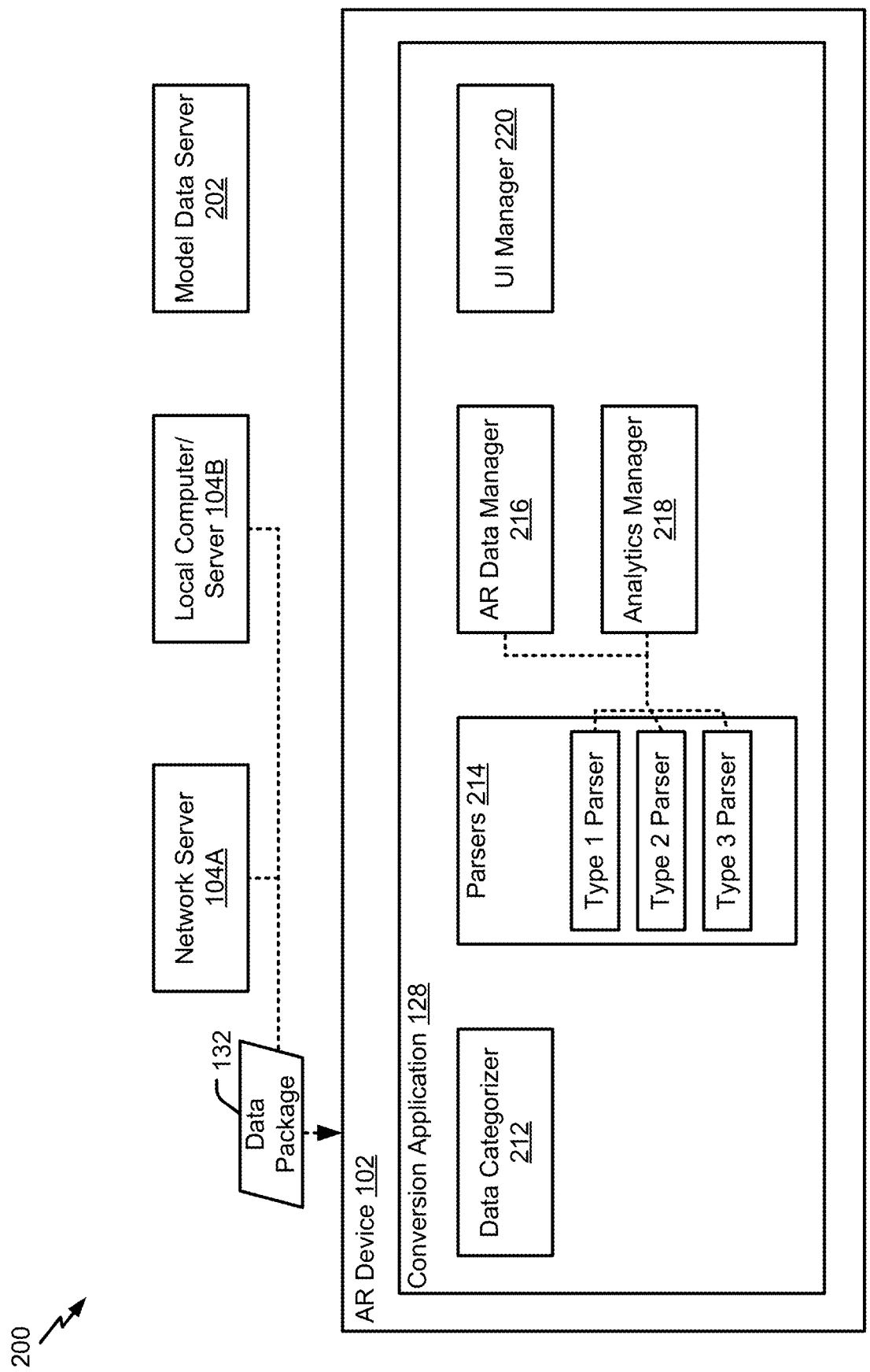
FIG. 2 is a block diagram that illustrates an example a conversion application.

FIG. 2 is a block diagram 200 of the system 100 for converting technical manual data of FIG. 1 including an example of the conversion application 128. As illustrated in FIG. 2, the system 100 includes the device 102, the first computer 104 (e.g., a network server 104A or a local computer/server 104B), and a model data server 202. The conversion application 128 includes a data categorizer 212, a plurality of parsers 214, an AR data manager 216, an analytics manager 218, and a UI manager 220.

The data categorizer 212 is configured to identify a technical manual corresponding to the obtained technical manual data 142 and to categorize the technical manual data 142. For example, the data categorizer 212 generates the categorization data 146 of FIG. 1 based on a flag of the technical manual data 142, a keyword of the technical manual data 142, a formatting of the technical manual data 142, a file format of the technical manual data 142, or a combination thereof. Alternatively, the conversion application 128 tests each parser of the plurality of parsers 214 until a particular parser parses the technical manual data 142 without a parser issue or error. If each parser produces a parser issue or error, the technical manual data 142 is stored until a parser can be updated or added to support the unknown format, as described further with reference to FIG. 3.

Each parser of the plurality of parsers 214 is configured to parse a particular type or format of technical manual data 142 to convert the particular type or format of technical manual data 142 to generate the converted technical manual data 148. The technical manual data 142 is converted from being in a file format that is formatted for document-like display to being in a file format that it readable and displayable by an AR device 102. Additionally, each parser 214 is configured to generate the data analytics object 150, based on the converted technical manual data 148. For example, a particular parser 214 generates fields of the data analytics object 150, as described further with reference to FIG. 4. Additionally or alternatively, the fields of the data analytics object 150 can be updated or appended responsive to receiving new or updated technical manual data 142.

The AR data manager 216 is configured to receive the converted technical manual data 148 from the plurality of parsers 214 and to store and track the converted technical manual data 148. The AR data manager 216 is configured to manage versions of the technical manuals, request updates for the technical manuals, edit the technical manuals, store notes for the technical manuals, or a combination thereof.

The analytics manager 218 is configured to coordinate generation of timestamps and to update the data analytics object 150. For example, the analytics manager 218 initiates a timer to generate timestamps or causes the processor 112 to generate timestamps based on the tasks of the fields of the data analytics object 150. The analytics manager 218 inserts or adds the timestamps to the data analytics object 150 to update the data analytics object 150 to track user performance metrics and task metrics. Additionally, the analytics manager 218 updates the data analytics object 150 responsive to an update message 164 or an action item 166. In other implementations, the analytics manager 218 is configured to generate the data analytics object 150 based on the converted technical manual data 148. Timestamps are generated or time based records are updated or recorded after each task or step to update the data analytics object 150. Interaction and selection based records are recorded or timestamps are generated when a button is pushed, a gestured is made, a voice command is spoken, etc. Tracking tasks/steps and interaction/selections enables usage tracking and identification of problem areas with users or devices.

The UI manager 220 is configured to generate and update a GUI based on the converted technical manual data 148, the sensor data, and the templates 152 of FIG. 1. In some implementations, the UI manager 220 is configured to generate, update, and/or modify the templates 152 based on user input, which is indicated by the sensor data generated by the sensors 122 of FIG. 1.

During operation, the AR device 102 obtains the data package 132 including the technical manual data 142 from the network server 104A or the local computer/server 104B. The data package 132 also includes the visual representations 144. In some implementations, the visual representations 144 include one or more two-dimensional images, and the conversion application retrieves three-dimensional model data from a model data database based on the two-dimensional images included in the data package 132. In such implementations, the conversion application 128 stores linking data that links the three-dimensional data to the two-dimensional images or to the converted technical manual data 148 to enable display of a three-dimensional model instead of or in addition to the two-dimensional images. The UI manager 220 generates and updates the GUI based on the two-dimensional images and the three-dimensional model data.

Figure 3:
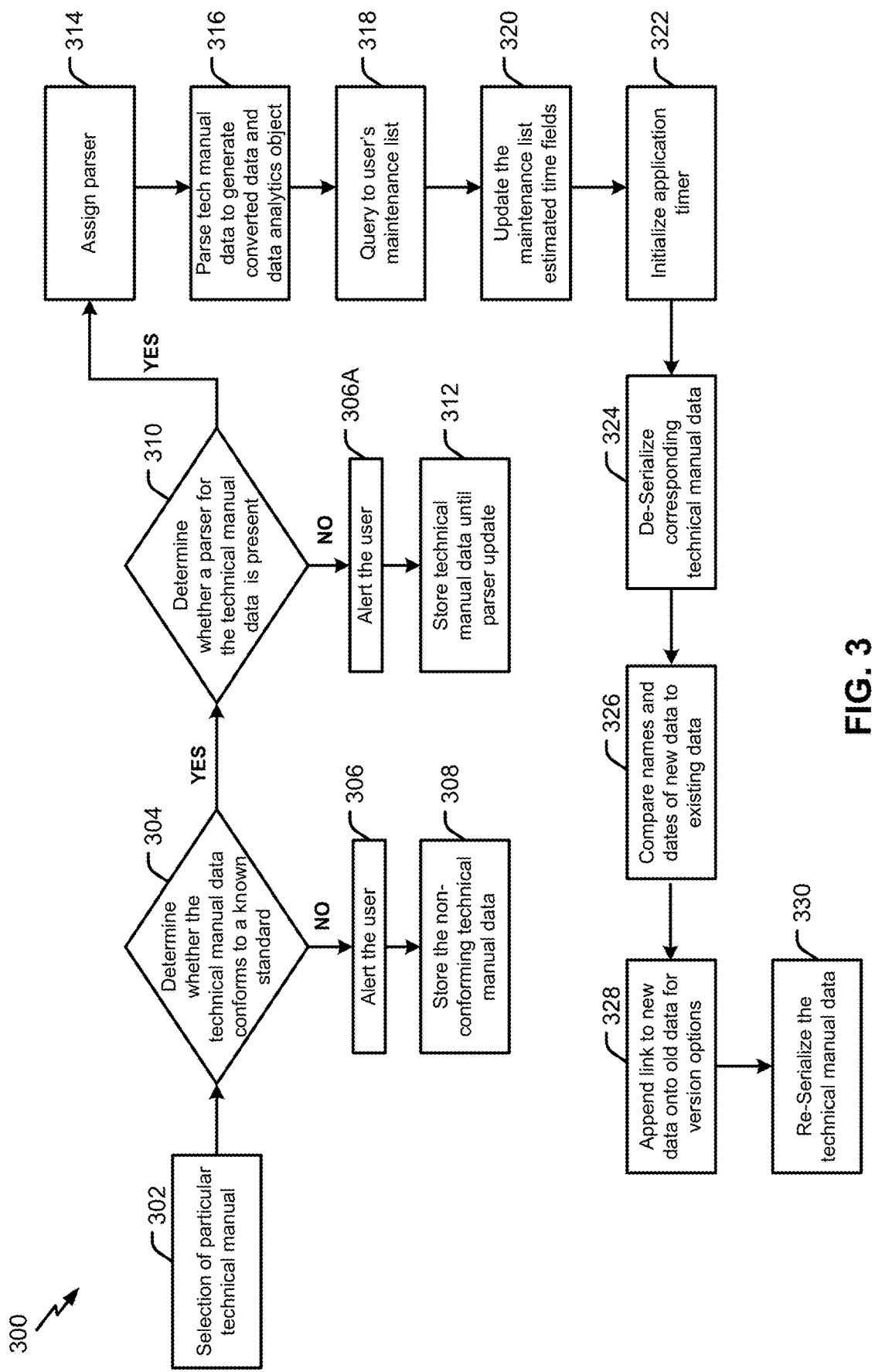
FIG. 3 is a flow chart of an example of a method of converting a technical manual and loading a module.

FIG. 3 is a flow chart 300 of an example of a loading a technical manual onto an AR device, such as the AR device 102 of FIG. 1. The method represented by the flow chart 300 may be performed by the system 100 of FIG. 1, such as the processor 112. In FIG. 3, the user selects a particular technical manual to load, at 302. The AR device 102 obtains a data package 132 that includes technical manual data 142 corresponding to the selected technical manual. For example, the AR device 102 retrieves the technical manual data 142 from local storage or from another computer, as described with reference to FIGS. 1 and 2. In the example illustrated in FIG. 3, the technical manual data 142 corresponds to updated technical manual data 172 (e.g., a second or updated version of a technical manual), and FIG. 3 includes operations that are performed when the AR device 102 receives an update for a technical manual.

At 304, the AR device 102 determines whether the technical manual data 142 (i.e., updated technical manual data 172) conforms to a type or format of technical manual data 142 known by the AR device 102, the conversion application 128, or both. At 306, the AR device 102 alerts the user responsive to determining that the technical manual data 142 does not conform to a type or format known by the AR device 102. At 308, the AR device 102 stores the non-conforming technical manual data 142. A user can manually reformat the non-conforming technical manual data 142 to generate conforming technical manual data 142, or the conversion application 128 can be updated to process the non-conforming technical manual data 142.

Alternatively, at 310, responsive to determining that the technical manual data 142 conforms to a type or format known by the AR device 102, the AR device 102 determines whether the conversion application 128 includes a parser for the type or format of the technical manual data 142. At 306A, the AR device 102 alerts the user responsive to determining that the conversion application 128 does not include a parser for the type or format of the technical manual data 142. At 312, the AR device 102 stores the technical manual data 142 until a parser corresponding to the technical manual data 142 is received. Once the conversion application 128 is updated with the parser corresponding to the technical manual data 142, the parser can be assigned to parse the technical manual data 142.

Alternatively, at 314, responsive to determining that the conversion application 128 includes a parser for the type or format of the technical manual data 142, the conversion application 128 assigns the parser to parse the technical manual data 142. At 316, the assigned parser parses the technical manual data 142 to generate the converted technical manual data 148 and the data analytics object 150. During the parsing process, when a two-dimensional image is identified, the AR device 102 may query the model data server 202 of FIG. 2 for three-dimensional model data to insert into the converted technical manual data 148 or append to the two-dimensional image.

At 318, the conversion application 128 generates and sends a query to a user's maintenance list (e.g., maintenance log or task queue). A query to a user's maintenance list describes the interaction between the manager and the software for the user. The program checks to see if the manager assigned to the user any specific tasks to be worked on for the day. Additionally, preventative maintenance is added to the list based on when the aircraft was last treated, assembly lifecycles, etc. This is done through analyzing how often the aircraft has been treated for different maintenance tasks and age of assemblies as compared to their useful life, and ultimately suggests to the user what should be done.

At 320, the conversion application 128 updates the estimated time (e.g., duration) fields of the maintenance list. The estimated time fields of the maintenance list can be updated generally (for all users) or for a specific user. To illustrate, the estimated time fields can be updated for a specific user based on how long past maintenance has taken. For example, if the task is added to the a particular user's maintenance list, the conversion application 128 averages the time it took previous users, taking into account skill level, and calculates how long it will take the previous user based on the user's skill level.

At 322, the conversion application 128 initializes a maintenance application timer based on the technical manual data 142. Initializing the application timer generates a start time used to initialize recorded events in the AR maintenance application 126.

At 324, the conversion application 128 de-serializes the converted technical manual data 148. In some applications, the conversion application 128 (e.g., a serializer thereof) is configured to serialize data that is converted, compressed, and stored in the device's memory. De-serialization converts converted, compressed, and stored data (i.e., the converted technical manual data 148) to an AR-readable format. To illustrate, the technical manual data 142 is in a first format for electronic display and is converted into the converted technical manual data 148, which is in a second format for AR display. The converted technical manual data 148 can be stored in a third format (e.g., a storage format). When the converted technical manual data 148 is called and accessed, the converted technical manual data 148 is converted from the third format to the second format, and the AR maintenance application 126 reads the converted technical manual data 148 in the second format and generates the GUI based on the converted technical manual data 148 in the second format. The conversion application 128 also deserializes stored converted technical manual data 148 upon startup or responsive to receiving technical manual data 142, updates, or both. The conversion application 128 performs deserialization to enable comparisons between different versions of converted technical manual data 148, such as an old and a new version of converted technical manual data 148. For example, new data can be added to an existing module collection as a new module describing a new task or as an update to an existing module with new information.

At 326, the conversion application 128 compares names and dates of the converted technical manual data 148 and the updated converted technical manual data 148. Comparing names and dates of new data to existing data enables version selection by a user, as described further below. At 328, the conversion application 128 appends a link to the updated converted technical manual data 148 onto the converted technical manual data 148. Appending new or updated data to the converted technical manual data 148 enables the storage of multiple versions of converted technical manual data 148. In some implementations, the updated or new data is set as a current or default version. Other versions can be selected through interaction with the GUI, as described further herein. At 330, the conversion application 128 serializes (e.g., re-serializes) the converted technical manual data 148. The conversion application 128 re-serializes the converted technical manual data 148 to convert the converted technical manual data 148 from the second format to the third format.

FIG. 4 is a diagram of an example of technical manual data 142 having a first format. In FIG. 4, the technical manual data 142 is in, or has, an SGM format. During a conversion operation, the processor 112 of FIG. 1 identifies markup data (e.g., SGM data) of the technical manual data 142 and converts the technical manual data 142 based on tags of the markup data to generate the converted technical manual data 148.

For example, a first parser from the parsers 214 identifies and generates a start and an end of a module based on a first tag type. In the example illustrated in FIG. 4, the first parser identifies and generates a start and an end of a module based on a mainfunc tag 402. A second parser from the parsers 214 identifies and generates reference links based on a second tag type. In the example illustrated in FIG. 4, the second parser identifies and generates reference links based on a bhid tag 404.

A third parser from the parsers 214 identifies and generates the visual representations based on a third tag type. In the example illustrated in FIG. 4, the third parser identifies and generates the visual representations based on a graphic boardno tag 408. A fourth parser from the parsers 214 identifies and generates pop-up messages based on a fourth tag type. In the example illustrated in FIG. 4, the fourth parser identifies and generates pop-up messages based on a caution tag 412. A fifth parser from the parsers 214 identifies and generates links based on a fifth tag type. As an illustrative example, the fifth parser identifies and generates links based on a refid tag.

Additionally or alternatively, when a refid tag is found, the fifth parser generates a reference image or an entirely new module to be referenced. In some implementations, the link or links, when displayed, are located near a bottom of the GUI. In other implementations, the link or links, when displayed, are located in-line (e.g., underlined, bolded, italicized, blue text, etc.). Selection of a link directs the user to another instruction set of how to perform the linked task. For example, the AR device 102 updates the GUI to display instructions for the linked task. As another example, the AR device 102 opens another module and generates a new GUI to display instructions for the linked task or module. In a particular implementation, the new GUI is opened in a separate window or is overlaid on top of the current GUI. In other implementations, the current GUI is closed or minimized.

A sixth parser from the parsers 214 identifies and generates titles based on a sixth tag type. In the example illustrated in FIG. 4, the sixth parser identifies and generates titles based on a title tag 406. A seventh parser from the parsers 214 identifies and generates text based on a seventh tag type. In the example illustrated in FIG. 4, the seventh parser identifies and generates text based on a para tag 410.

An eighth parser from the parsers 214 identifies or generates difficulty levels or proficiency levels based on formatting, such as formatting 422-426. Additionally or alternatively, the eighth parser identifies or generates the difficulty levels or proficiency levels based on one or more additional tags. In the example illustrated in FIG. 4, the eighth parser identifies an amount of indentation or a number of tabs and generates a corresponding proficiency level based on the amount of indentation or the number of tabs, such that a first amount of indentation indicates a higher proficiency level (e.g., the user can perform the task with less instruction) and a second amount of indentation indicates a lower proficiency level (e.g., the user can perform the task with more instruction). The first-eighth parsers include or correspond to sub-parsers of particular parser of the parsers 214 or parsers of a particular parser group of the parsers 214.

FIG. 5 is a diagram illustrating an example of the data analytics object 150 of FIG. 1. The data analytics object 150 includes multiple fields and sub-fields. In other implementations, the data analytics object 150 includes additional fields, subfields or both, or includes fewer fields, subfields, or both. In FIG. 5, the data analytics object 150 includes task log data (e.g., a task log field 512 including task log subfields 522-526), a task ID field 514, a task name field 516, a difficulty level field 518, and a version field 520. The task log subfields include a user ID field 522, a timestamp field 524, and a proficiency field 526. In the example illustrated in FIG. 5, the fields and subfields correspond to columns of the data analytics object 150.

The task ID field 514, corresponding to a fourth column of the data analytics object 150 in FIG. 5, indicates a particular task or module of the technical manual data 142. As illustrated in FIG. 5, the task ID can be indicated by a number. In a particular implementation, the task ID is automatically assigned by the conversion application 128 when the parser assigned to generate the converted technical manual data 148 identifies a particular portion of the technical manual data 142 that includes instructions corresponding to a task. The task name field 516, corresponding to a fifth column of the data analytics object 150 in FIG. 5, indicates the name or description of the task indicated by the task ID.

The difficulty level field 518, corresponding to a sixth column of the data analytics object 150 in FIG. 5, indicates a degree of difficulty associated with the task ID. The difficulty may be indicated by the technical manual data 142 for the task ID. Alternatively, the difficulty may be determined based on an average time a technician takes to complete the task, an average error rate associated with the task, an amount of equipment or technicians suggested to complete the task, etc., or a combination thereof. The version field 520, corresponding to a seventh column of the data analytics object 150 in FIG. 5, indicates a date, a version, or a revision number associated with the technical manual data 142 corresponding to the task ID.

The user ID field 522 indicates a user name of the user (e.g., maintenance technician, supervisor, or both). In the example illustrated in FIG. 5, the user ID is a number. The timestamp field 524 includes timestamp data; the timestamp data may include one or more timestamps indicating, a start time (e.g., a time and date when the user associated with the user ID started performance of the task associated with the task ID), an end time (e.g., a time and date when the user associated with the user ID ended performance of the task associated with the task ID), etc. The proficiency field 526 indicates a skill level with which the user associated with the user ID completed the task. The skill level (e.g., novice or expert) can be determined based on the timestamps, the difficulty level, which sections of the module were accessed (e.g., novice or master level instructions), sensor data, or a combination thereof.

A first entry 532 of the data analytics object 150 corresponds to data of a first row of the data analytics object 150. The first entry 532 corresponds to a first user (143220) and a first task (Ser. No. 01/562,103). A second entry 534 of the data analytics object 150 corresponds to data of an eighth row of the data analytics object 150. The second entry corresponds to a second user (455021) and a second task (41216884). Thus, the data analytics object 150 can be used to evaluate performance of a particular task by multiple users, to evaluate efficiency or effectiveness of a particular user who performed several distinct tasks, or combinations thereof.

FIGS. 6-18 illustrate example GUIs output by the AR device 102 of FIG. 1.

Figure 6:
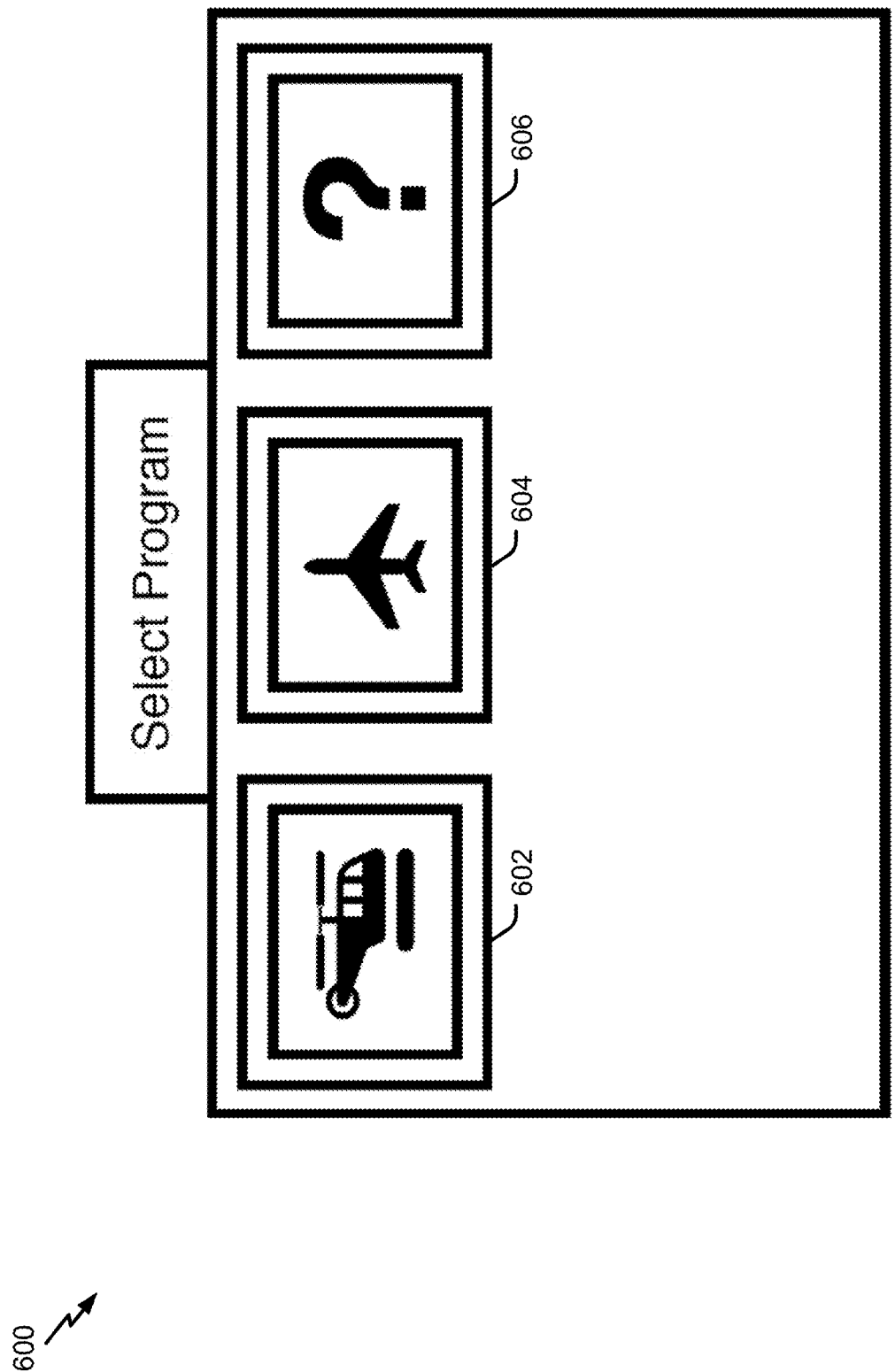
FIG. 6 is a diagram that illustrates an example of a program select graphical user interface (GUI) of an augmented reality (AR) device.

Additionally, operation of a maintenance module is explained with reference to FIGS. 6-18. FIG. 6 illustrates a diagram of an example of a program select GUI 600 of the AR device 102. In the example illustrated in FIG. 6, the program select GUI 600 includes three different programs, a first program 602 (e.g., a helicopter program), a second program 604 (e.g., an aircraft program), and a third program 606 (e.g., a help program). The first and second programs 602, 604 correspond to different technical manuals for different equipment or platforms and are in different technical manual formats. The third program 606, when accessed, may display a help GUI including a list of commands, inputs, and/or controls for the AR device 102. Additionally, or alternatively, the third program 606 may display a menu GUI for customizing the commands, inputs, and/or controls, notifications, GUI templates, or a combination thereof.

Figure 7:
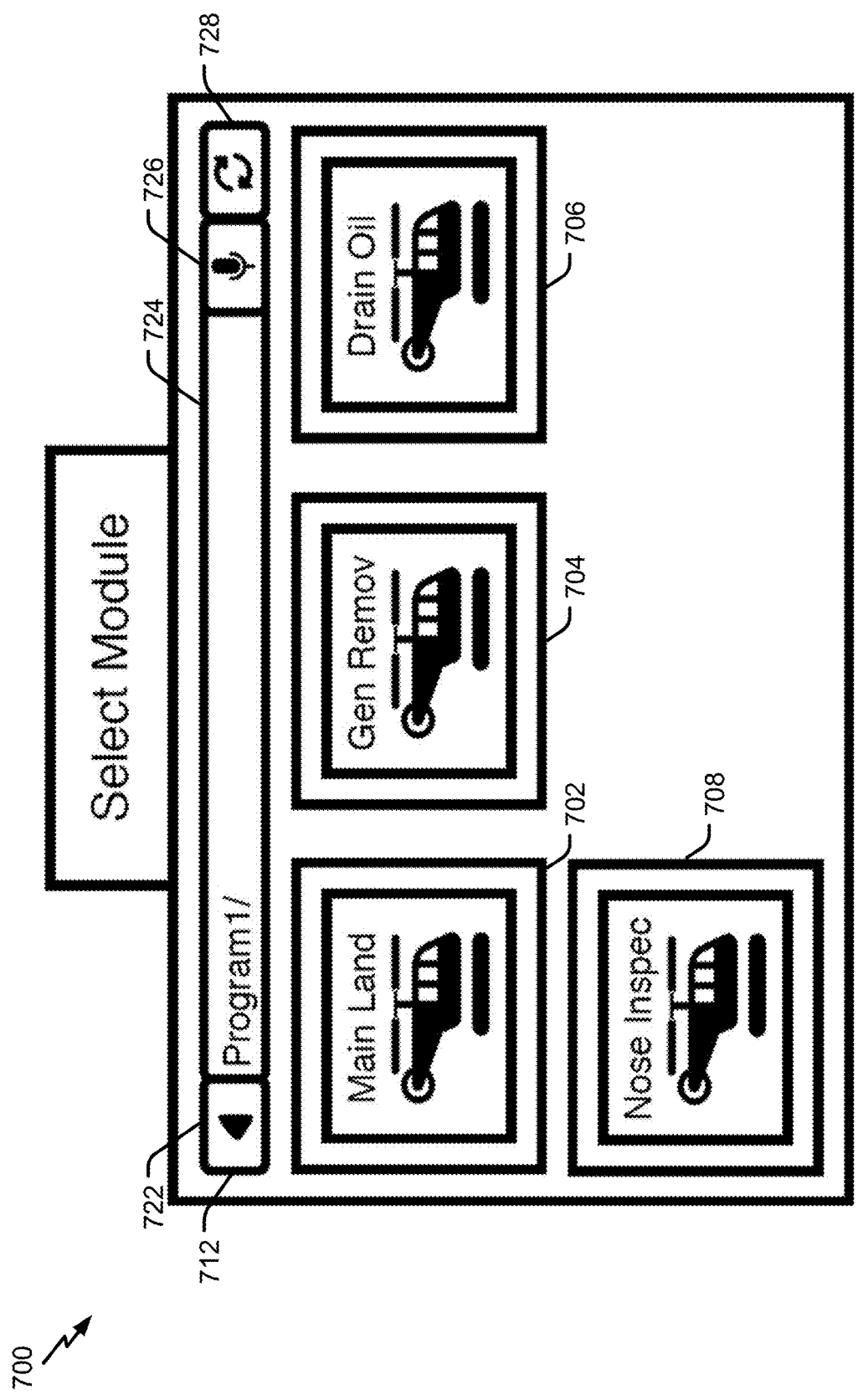
FIG. 7 is a diagram that illustrates an example of a module select GUI of an AR device.

FIG. 7 illustrates a diagram of an example of a module select GUI 700 of the AR device 102. In the example illustrated in FIG. 7, the module select GUI 700 includes four different module buttons, a first module button 702 (e.g., main landing gear module), a second module button 704 (e.g., generator removal module), a third module button 706 (e.g., drain oil module), and a fourth module button 708 (e.g., nose inspection module). In other implementations, the module select GUI 700 includes more than four modules or fewer than four modules. Responsive to a user selecting the first program 602, the AR device 102 outputs the module select GUI 700. Each module button is associated with a maintenance activity that includes one or more tasks. A user can select a particular module button to access data and GUIs associate with performance of the corresponding maintenance activity.

Additionally, the module select GUI 700 includes a navigation bar 712. In the example illustrated in the example of FIG. 7, the navigation bar 712 includes back button 722, an address bar 724, a microphone button 726, and a refresh button 728. The back button 722 causes AR device 102 to display a previously displayed GUI, such as the program select GUI 600. The address bar 724 displays a name or address of a current or selected program, such as program 1. The microphone button 726 toggles voice commands on and off. Additionally or alternatively, the microphone button 726 displays a list of applicable voice commands for the displayed GUI, i.e., the module select GUI 700. The refresh button 728 checks for updates, resets the displayed modules, or both.

In some implementations, the module select GUI 700 further includes a visual representation 144 of the object or equipment associated with the chosen program. For example, the module select GUI 700 includes a two dimensional image, a three dimensional model, or both. The visual representation 144 can be displayed adjacent to the module select GUI 700. The user can filter which modules are displayed by the module select GUI 700 by tapping or looking at a particular region of the visual representation 144 of the object or equipment or by looking at a particular region of a physical instance of the object or equipment associated with the chosen program. For example, the AR device 102 displays the modules which match a region indicated by the user by tapping, looking, or speaking (and does not display other modules which do not match a region indicated by the user). To illustrate, each module has associated region information, and the AR device 102 displays modules which have region information values that match or are close to the region information value indicated by the user (via a gesture or an audio command).

Figure 8:
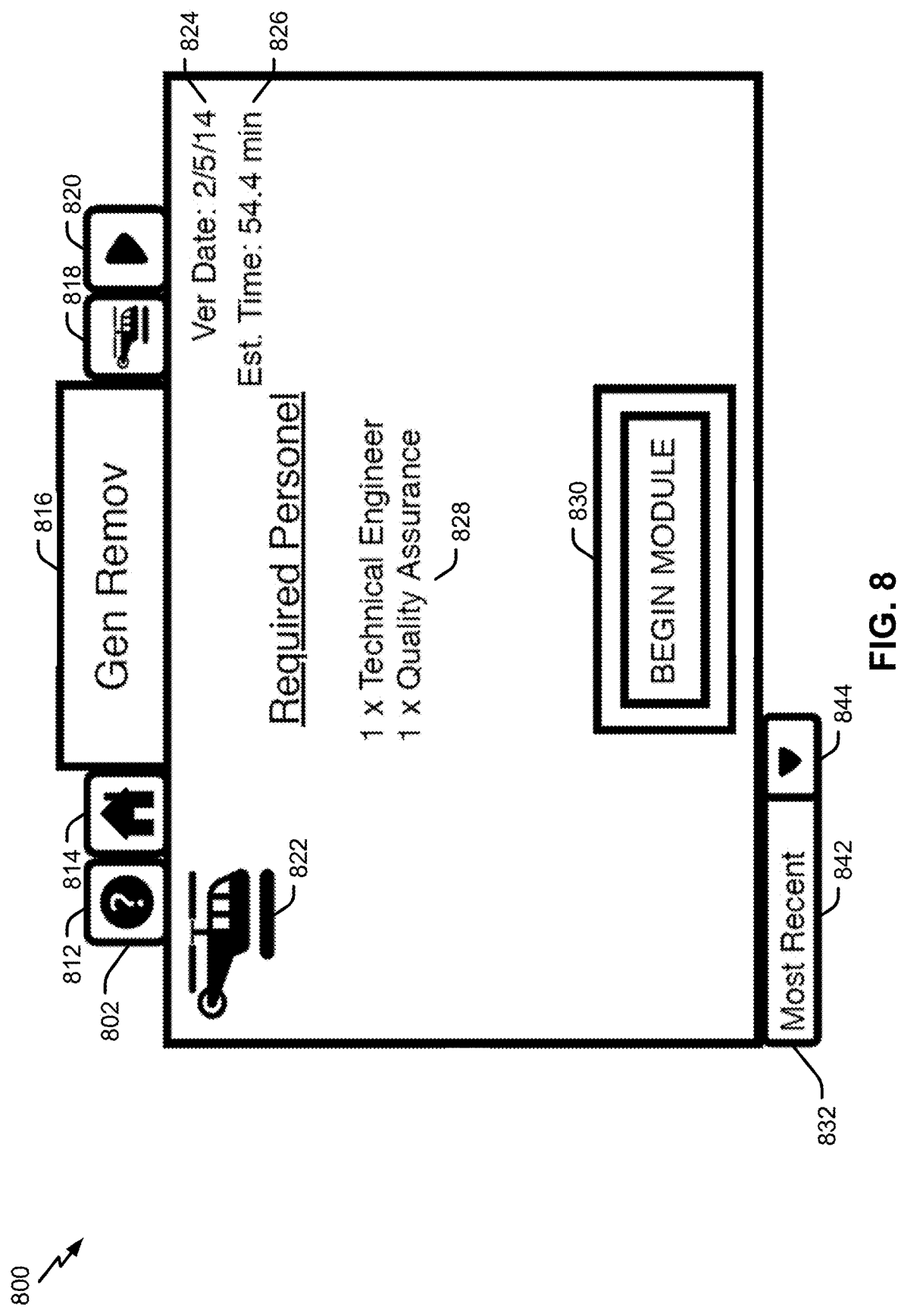
FIG. 8 is a diagram that illustrates an example of a module home GUI of an AR device.
Figure 12:
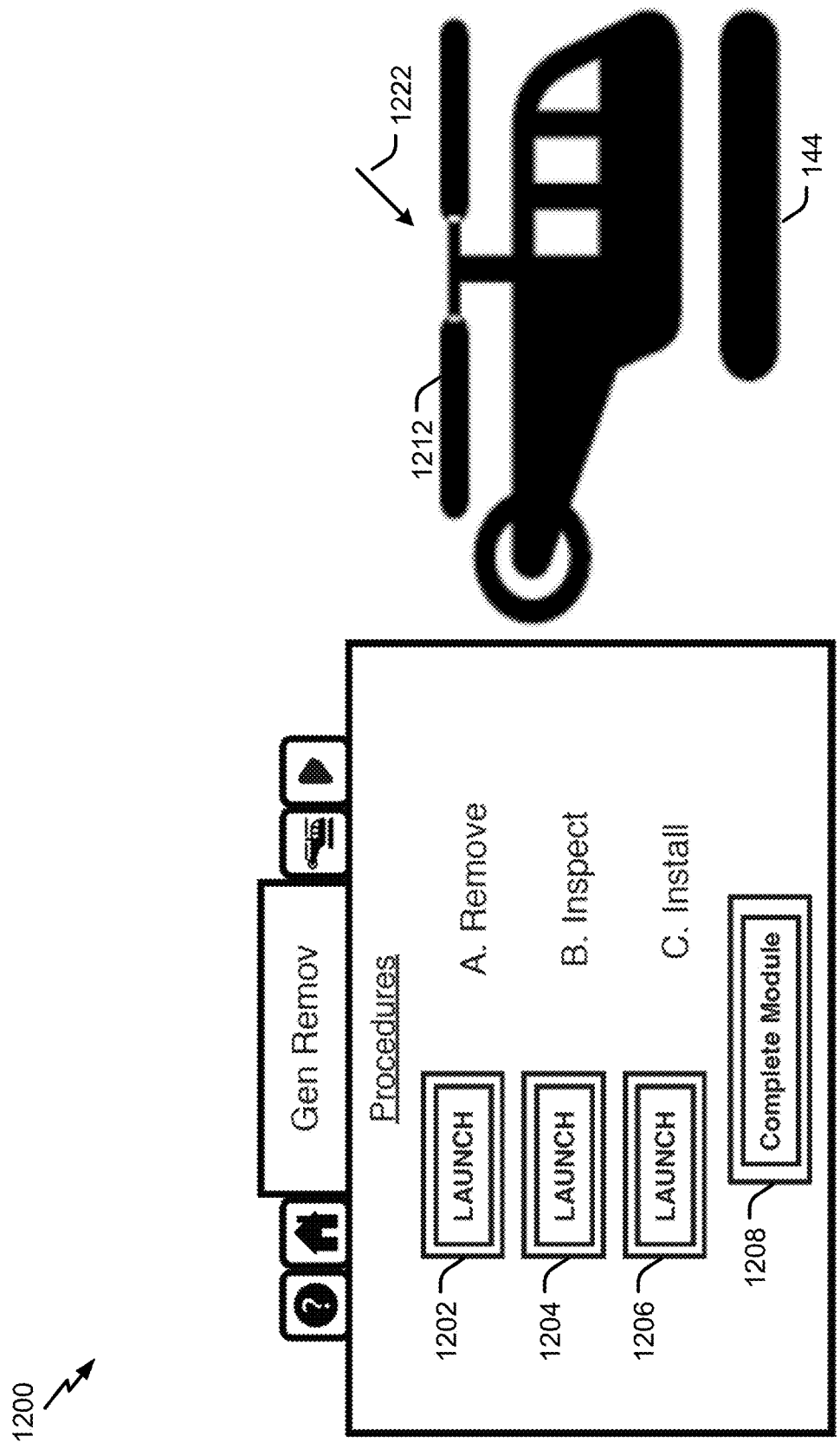
FIG. 12 is a diagram that illustrates an example of a procedures page GUI of an AR device.

FIG. 8 illustrates a diagram of an example of a module home GUI 800 of the AR device 102. In the example illustrated in FIG. 8, the module home GUI 800 includes a navigation toolbar 802 including a help program link 812 (e.g., a shortcut), a home screen link 814, a module name field 816, a 3D model toggle button 818, and a 2D image toggle button 820. The help program link 812 displays a help GUI which lists gesture commands, audio commands, or a combination thereof, that the user can use to control the AR device 102 and relevant descriptions of the gesture commands, audio commands, or the combination thereof. For example, for the voice command "check" an exemplary relevant description includes "activates a first empty check box or a selected empty check box." The home screen link 814 displays a home screen GUI, such as the program select GUI 700 of FIG. 7 or a task queue GUI 1800 of FIG. 18, or a sign-in GUI, such as a sign-in GUI 1700 of FIG. 17. The 3D model toggle button 818 is configured to toggle on and off display of 3D model data. The 2D image toggle button 820 is configured to toggle on and off display of the 2D image. The 3D model data, 2D image, or both, can be displayed to the left or right of the module home GUI 800, such as illustrated in FIG. 12.

The module home GUI 800 includes a module icon 822, version information 824, duration information 826, personnel information 828, a begin module button 830, or a combination thereof. In a particular implementation, the version information 824 includes or is associated with a link to a multiple versions of the technical manual, which enables a user to select a particular version of the technical manual (e.g., the technical manual data 142 or the updated technical manual data 172).

In some implementations, the module home GUI 800 includes a second navigation toolbar 832. In the example illustrated in FIG. 8, the second navigation toolbar 832 includes a list 842 (e.g., a drop down list) of previous pages (GUIs) and an activation button 844. Additionally, the module home GUI 800 can include tool information, part, information, consumable information, or a combination thereof. The tool, part and consumable information indicate tools, parts, and/or consumables used during performance of the module, as illustrated in and described further with respect to FIGS. 10 and 11. Responsive to a user selecting the second module button 704, the AR device 102 outputs the module home GUI 800 associated with the second module button 704.

Figure 9:
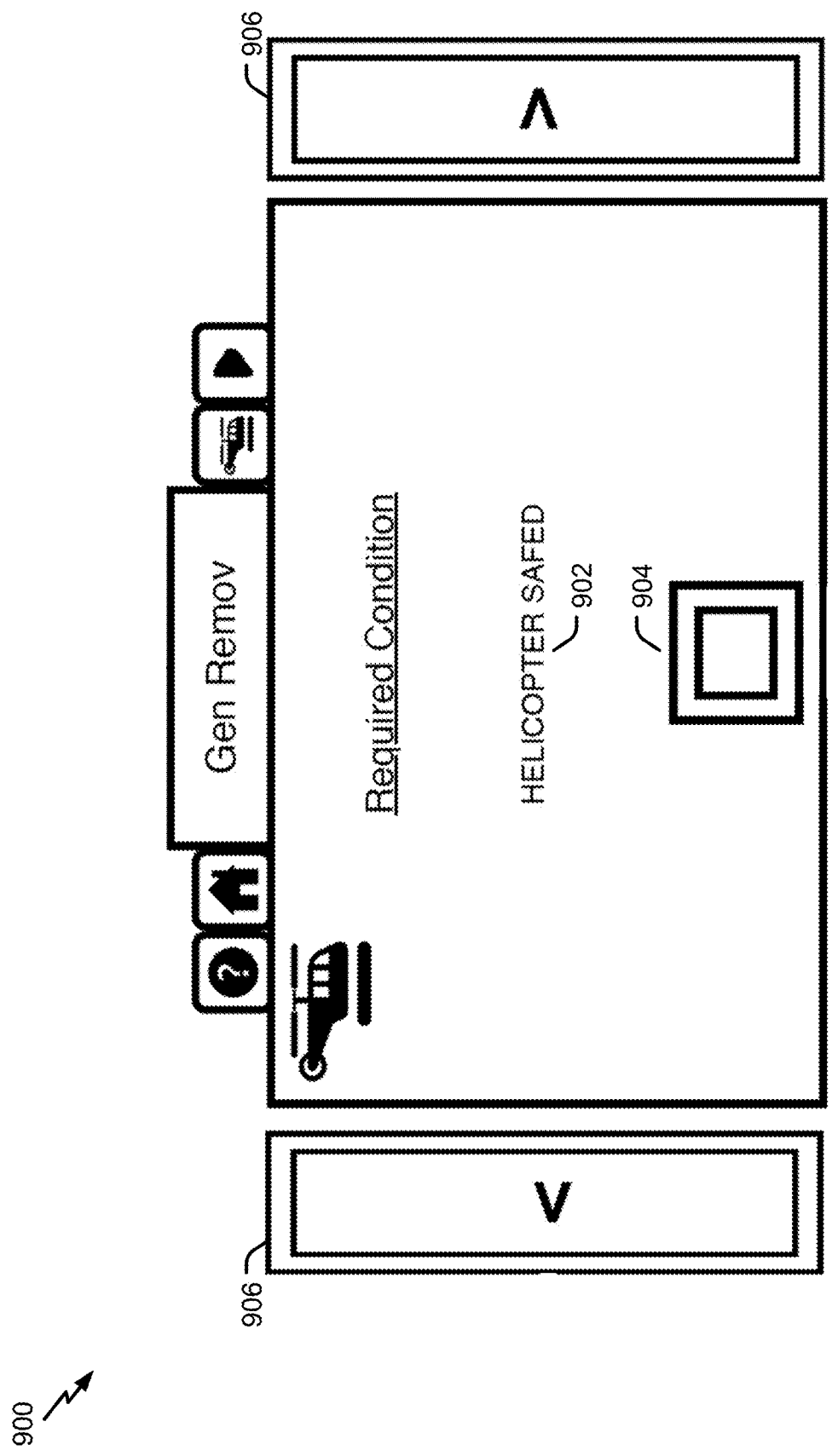
FIG. 9 is a diagram that illustrates an example of a task page GUI of an AR device.

FIG. 9 illustrates a diagram of an example of a task page GUI 900 of the AR device 102. In the example illustrated in FIG. 9, the task page GUI 900 corresponds to a condition task page and includes text instructions 902, a check box 904, and navigation bars 906. The check box 904 corresponds to the text instructions 902 and a user may activate the check box 904 after completing a task identified by the text instructions 902. In some implementations, the AR device 102 may not display a next GUI if an empty (unactivated) check box 904 is present on the displayed GUI. In a particular implementation, the AR device 102 outputs the task page GUI 900 responsive to a user activating the begin module button 830 of the module home GUI 800 of FIG. 8. For example, the user may activate the begin module button 830 by a making finger gesture or by providing an audio command.

Figure 10:
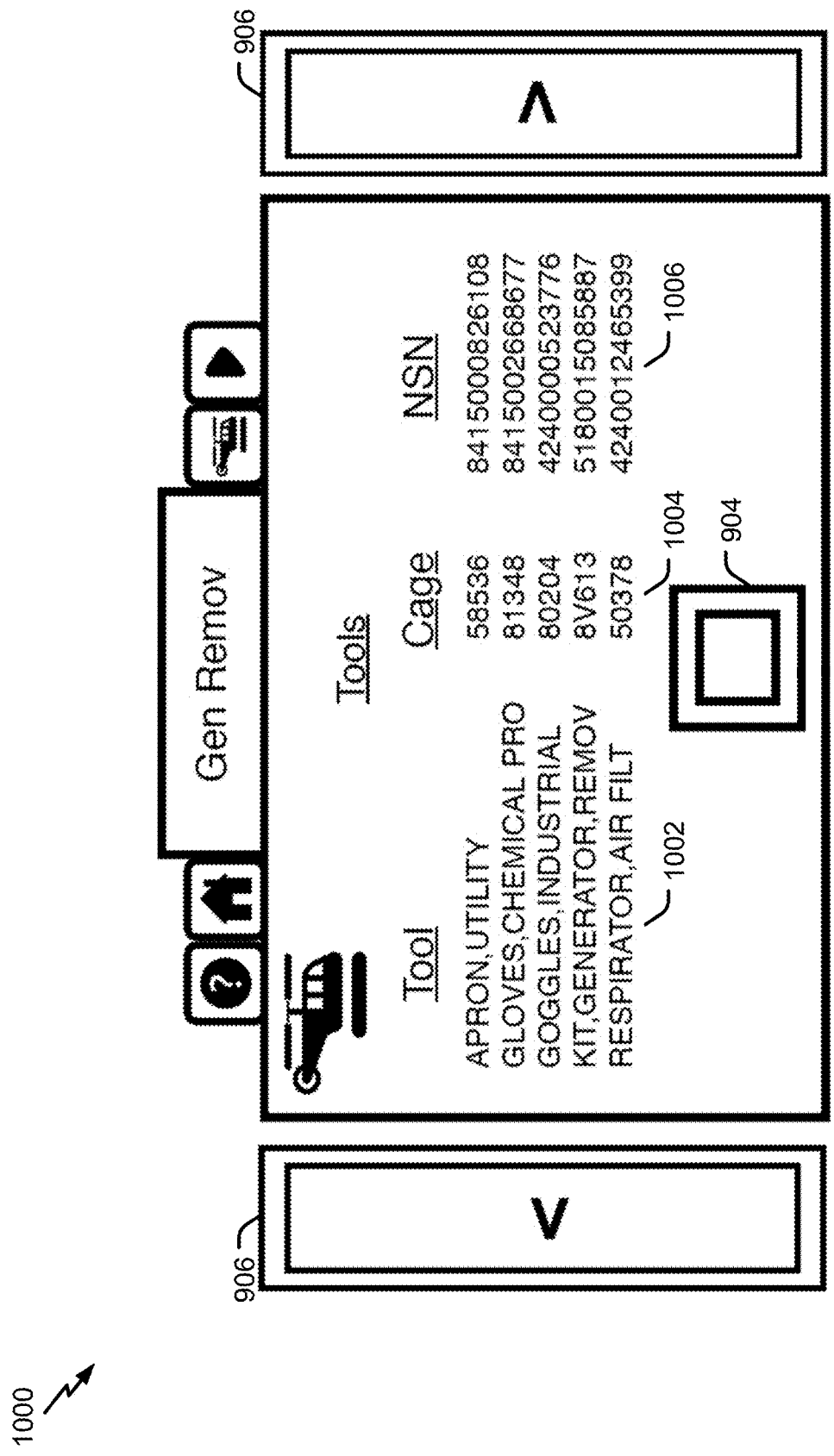
FIG. 10 is a diagram that illustrates an example of a task page GUI of an AR device.

FIG. 10 illustrates a diagram of another example of a task page GUI 1000 of the AR device 102. In a particular implementation, the AR device 102 outputs the task page GUI 1000 responsive to a user activating the check box 904 of the task page GUI 900 of FIG. 9, activating the right navigation bar 906 of the task page GUI 900 of FIG. 9, saying next, or a combination thereof. For example, the user may activate the check box 904 by a finger gesture or by providing an audio command ("check"), the user may activate the navigation bar 906 by looking right, turning their head right, or saying next page.

In the example illustrated in FIG. 10, the task page GUI 1000 corresponds to a tools list task page and includes a list of tools 1002, a list of tool locations 1004, a list of tool serial numbers 1006, a check box 904, and navigation bars 906.

Figure 11:
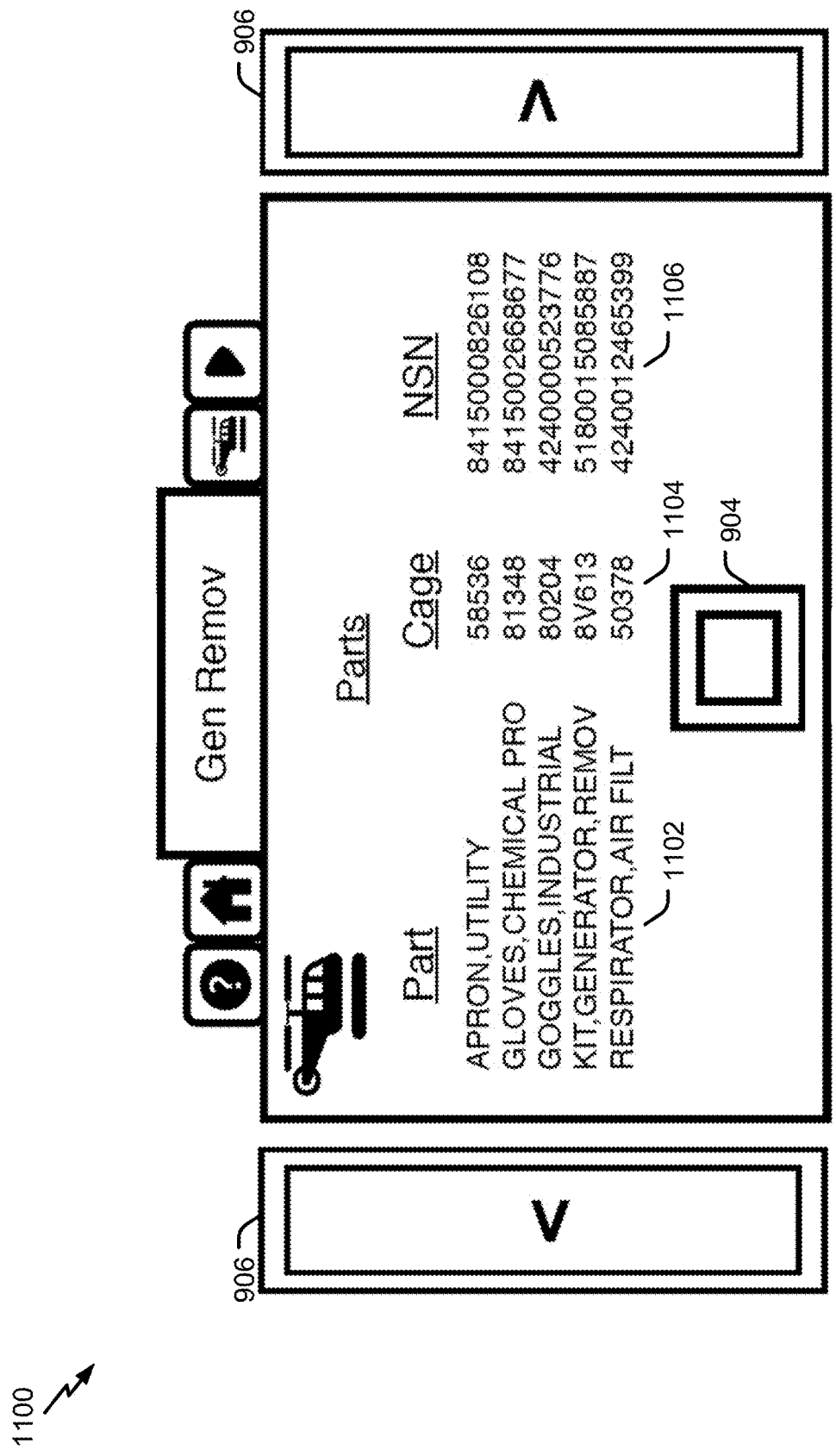
FIG. 11 is a diagram that illustrates an example of a task page GUI of an AR device.

FIG. 11 illustrates a diagram of another example of a task page GUI 1100 of the AR device 102. In a particular implementation, the AR device 102 outputs the task page GUI 1100 responsive to a user activating the check box 904 of the task page GUI 1000 of FIG. 10, activating the right navigation bar 906 of the task page GUI 1000 of FIG. 10, saying next, or a combination thereof, the AR device 102.

In the example illustrated in FIG. 11, the task page GUI 1100 corresponds to a parts list task page including a list of parts 1102, a list of part locations 1104, a list of part serial numbers 1106, a check box 904, and navigation bars 906.

FIG. 12 illustrates a diagram of an example of a procedures page GUI 1200 of the AR device 102. In a particular implementation, the AR device 102 outputs the procedures page GUI 1200 responsive to a user activating the check box 904 of the task page GUI 1100 of FIG. 11, activating the right navigation bar 906 of the task page GUI 1100 of FIG. 11, saying next, or a combination thereof.

In the example illustrated in FIG. 12, the procedures page GUI 1200 includes multiple procedure buttons 1202-1206 and a complete module button 1208. The multiple procedure buttons 1202-1206 include a first procedure button 1202 corresponding to a remove procedure, a second procedure button 1204 corresponding to an inspect procedure, and a third procedure button 1206 corresponding to an install procedure of the selected module. Activating one or more of the procedure buttons 1202-1206 causes task pages (e.g., subprocedures) of the selected procedure to be displayed. The task pages include more information on the procedures, i.e., instructions on how to perform the tasks thereof. Activation of one or more of the procedure buttons 1202-1206 corresponds to the user activating a novice task.

Additionally, the procedures page GUI 1200 includes a visual representation 144 of the object or equipment associated with the module. In the example illustrated in FIG. 12, the visual representation 144 is a three dimensional model 1212 of the object and includes an arrow 1222 pointing to a region or location associated with a procedure or task of the module.

Figure 13:
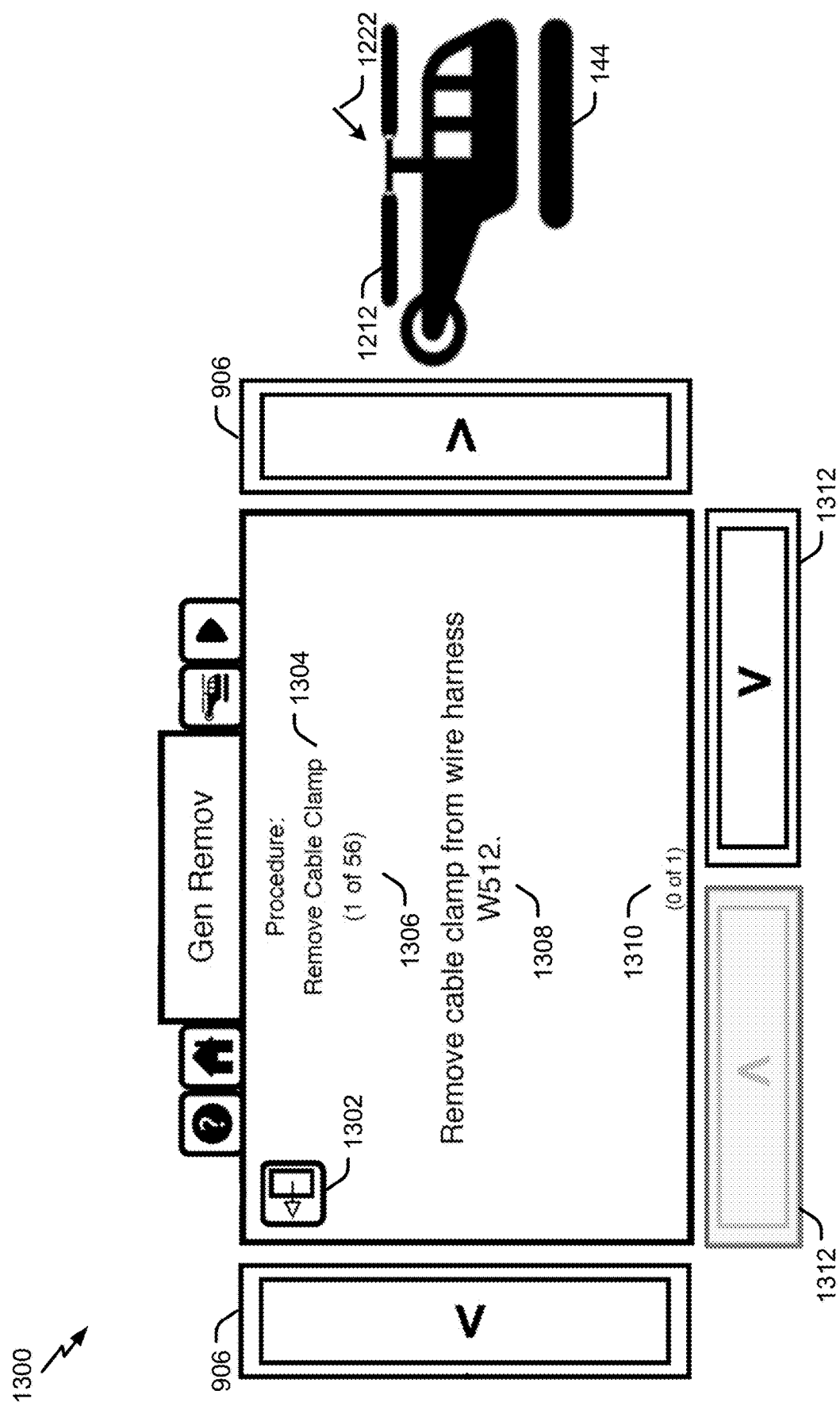
FIG. 13 is a diagram that illustrates an example of a task page GUI of an AR device.

FIG. 13 illustrates a diagram of another example of a task page GUI 1300 of the AR device 102. In a particular implementation, the AR device 102 outputs the task page GUI 1300 responsive to a user activating the first procedure button 1202 of the procedures page GUI 1200 of FIG. 12, saying next, saying novice, or a combination thereof.

In the example illustrated in FIG. 13, the task page GUI 1300 includes a procedure exit button 1302, procedure name information 1304, procedure number information 1306, procedure instruction information 1308, and procedure task number information 1310.

Additionally, the task page GUI 1300 includes second navigation bars 1312 (e.g., intraprocedures navigation bars or task navigation bars). In the example illustrated in FIG. 13, the second navigation bars 1312 include a greyed out back button (up arrow) and include a next button (down arrow) for navigating within the selected removal procedure, e.g., navigating from task to task of the procedure or through multiple pages of a single task. The back button is greyed out because the task page GUI 1300 corresponds to the first page of the first task.

The task page GUI 1300 includes a visual representation 144 of the object or equipment associated with the module. In the example illustrated in FIG. 13, the visual representation 144 is a three dimensional model 1212 of the object and includes an arrow 1222 pointing to a region or location associated with a first task of the first procedure. The task page GUI 1300 corresponds to a first page of the first task.

Figure 14:
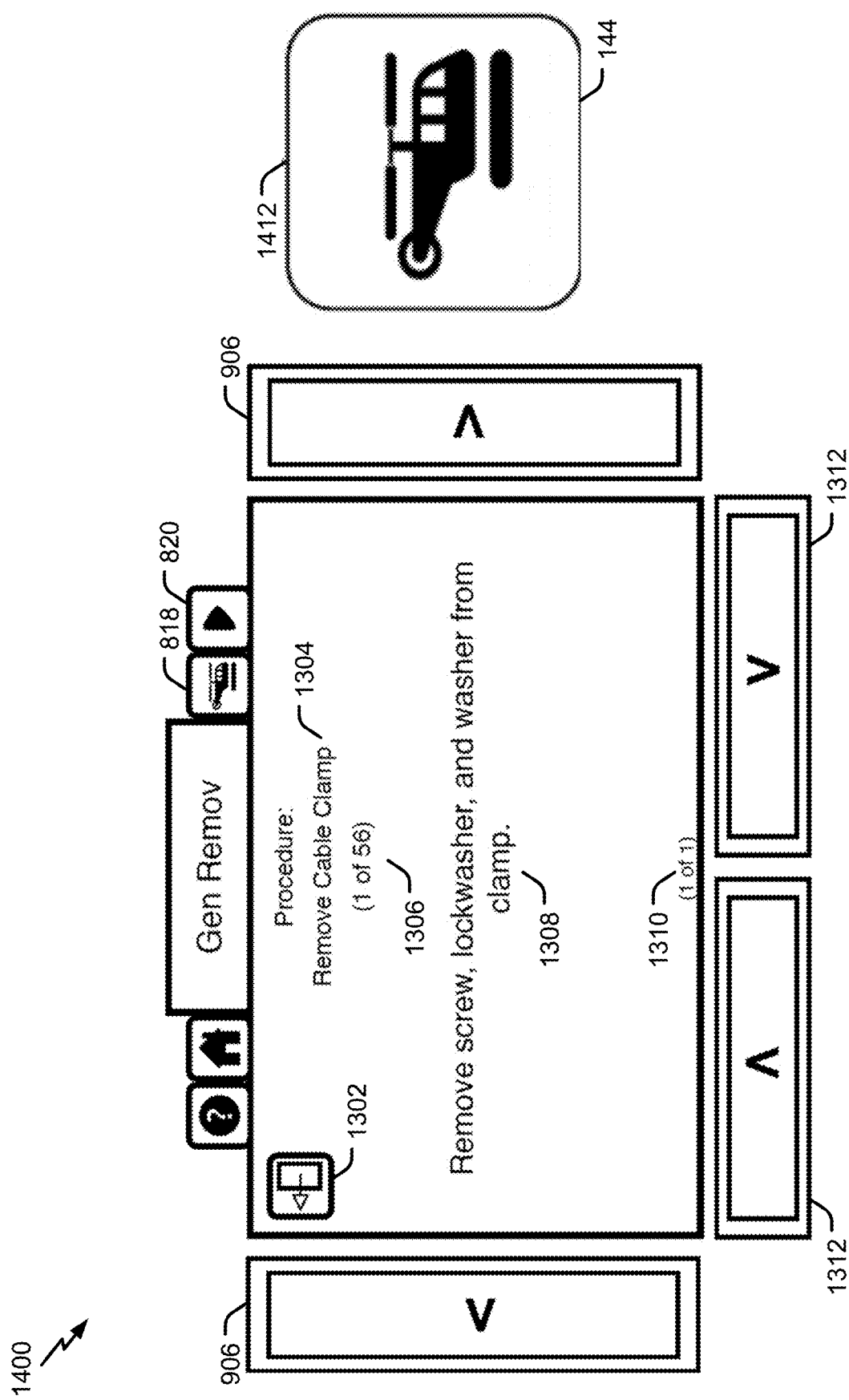
FIG. 14 is a diagram that illustrates an example of a task page GUI of an AR device.

FIG. 14 illustrates a diagram of another example of a task page GUI 1400 of the AR device 102. In a particular implementation, the AR device 102 outputs the task page GUI 1400 responsive to a user activating the right second navigation bar 1312 of the task page GUI 1300 of FIG. 13, saying next, or a combination thereof.

In the example illustrated in FIG. 14, the task page GUI 1400 includes a procedure exit button 1302, procedure name information 1304, procedure number information 1306, procedure instruction information 1308, and procedure task number information 1310. The task page GUI 1400 corresponds to a second page of the first task of the first procedure, and the procedure instruction information 1308 includes instructions for performing the next step of the first task.

Additionally, the task page GUI 1400 includes second navigation bars 1312 (e.g., intraprocedures navigation bars or task navigation bars). In the example illustrated in FIG. 14, the second navigation bars 1312 include a back button (up arrow) and a next button (down arrow) for navigating within the selected removal procedure, e.g., navigating from task to task of the procedure or through multiple pages of a single task.

Additionally, the task page GUI 1400 includes a visual representation 144 of the object or equipment associated with the module. In the example illustrated in FIG. 14, the visual representation 144 is a two-dimensional image 1412 of the object. In some implementations, the two-dimensional image 1412 includes additional information about the object, the procedure task number information 1310, or both. In a particular implementation, the AR device 102 outputs the task page GUI 1400 including the two-dimensional image 1412 (and not including the three dimensional model 1212) responsive to a user activating the 3D model toggle button 818 and the 2D image toggle button 820. In other implementations, the task page GUI 1400 can display both the three dimensional model 1212 and the two-dimensional image 1412, such as side-by-side, stacked, etc.

Figure 15:
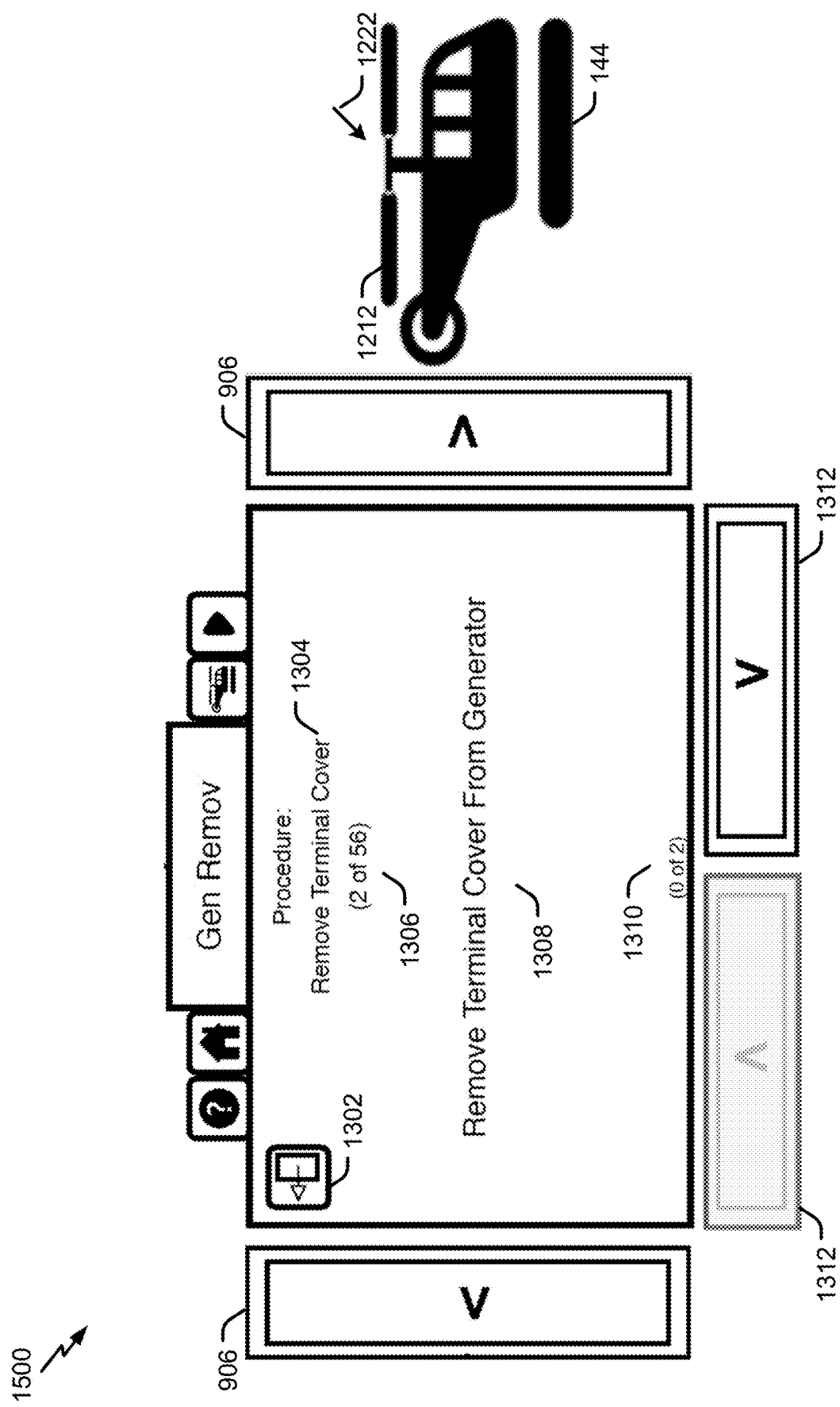
FIG. 15 is a diagram that illustrates an example of a task page GUI of an AR device.

FIG. 15 illustrates a diagram of another example of a task page GUI 1500 of the AR device 102. In a particular implementation, the AR device 102 outputs the task page GUI 1500 responsive to a user activating the right second navigation bar 1312 of the task page GUI 1400 of FIG. 14, saying next, or a combination thereof.

In the example illustrated in FIG. 15, the task page GUI 1500 includes a procedure exit button 1302, procedure name information 1304, procedure number information 1306, procedure instruction information 1308, and procedure task number information 1310. The task page GUI 1500 corresponds to a first page of a second task of the first procedure.

Additionally, the task page GUI 1500 includes a visual representation 144 of the object or equipment associated with the module. In the example illustrated in FIG. 15, the visual representation 144 is a three dimensional model of the object and includes an arrow pointing to a region or location associated with a procedure or task of the module. The back button is greyed out because the task page GUI 1500 corresponds to the first page of the second task. During operation, the remaining tasks of a selected module are performed by the user, however, to avoid obfuscating the invention, the remaining tasks are not explicitly shown.

Figure 16:
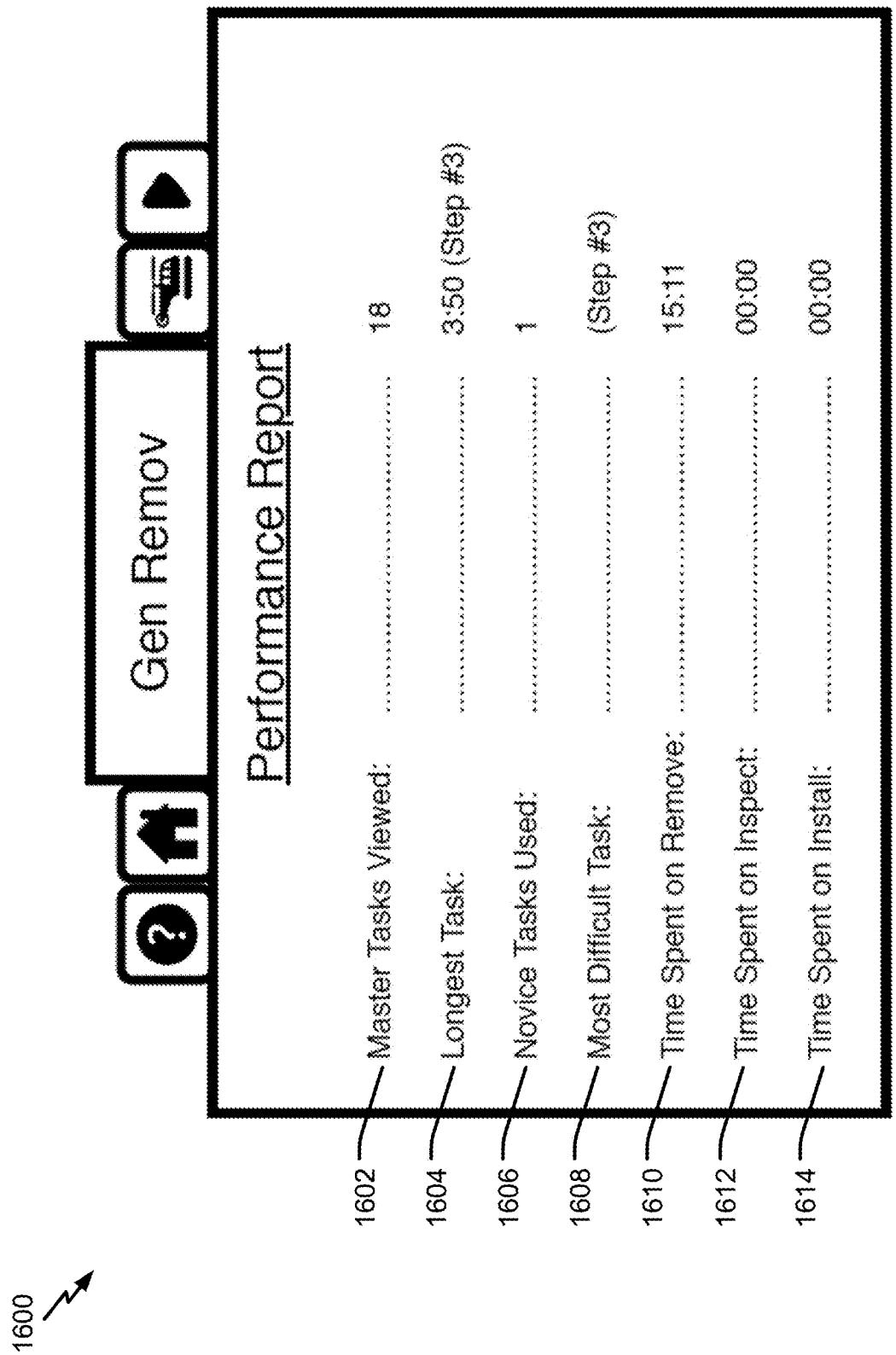
FIG. 16 is a diagram that illustrates an example of a performance report GUI of an AR device.

FIG. 16 illustrates a diagram of an example of a performance report GUI 1600 of the AR device 102. In the example illustrated in FIG. 16, the performance report GUI 1600 includes information corresponding to performance of a module or task. In the example illustrated in FIG. 16, the performance report GUI 1600 includes master tasks viewing information 1602 (e.g., a number of task viewed without using novice information), longest task information 1604, novice tasks used information 1606 (e.g., a number of tasks performed while viewing detailed instructions), most difficult task information 1608, time spent on remove information 1610, time spent on inspect information 1612, and time spent on install information 1614. The performance report can be used to identify remediation actions for action items 166, a user proficiency for the proficiency field 526 of the data analytics object 150, or both.

Figure 17:
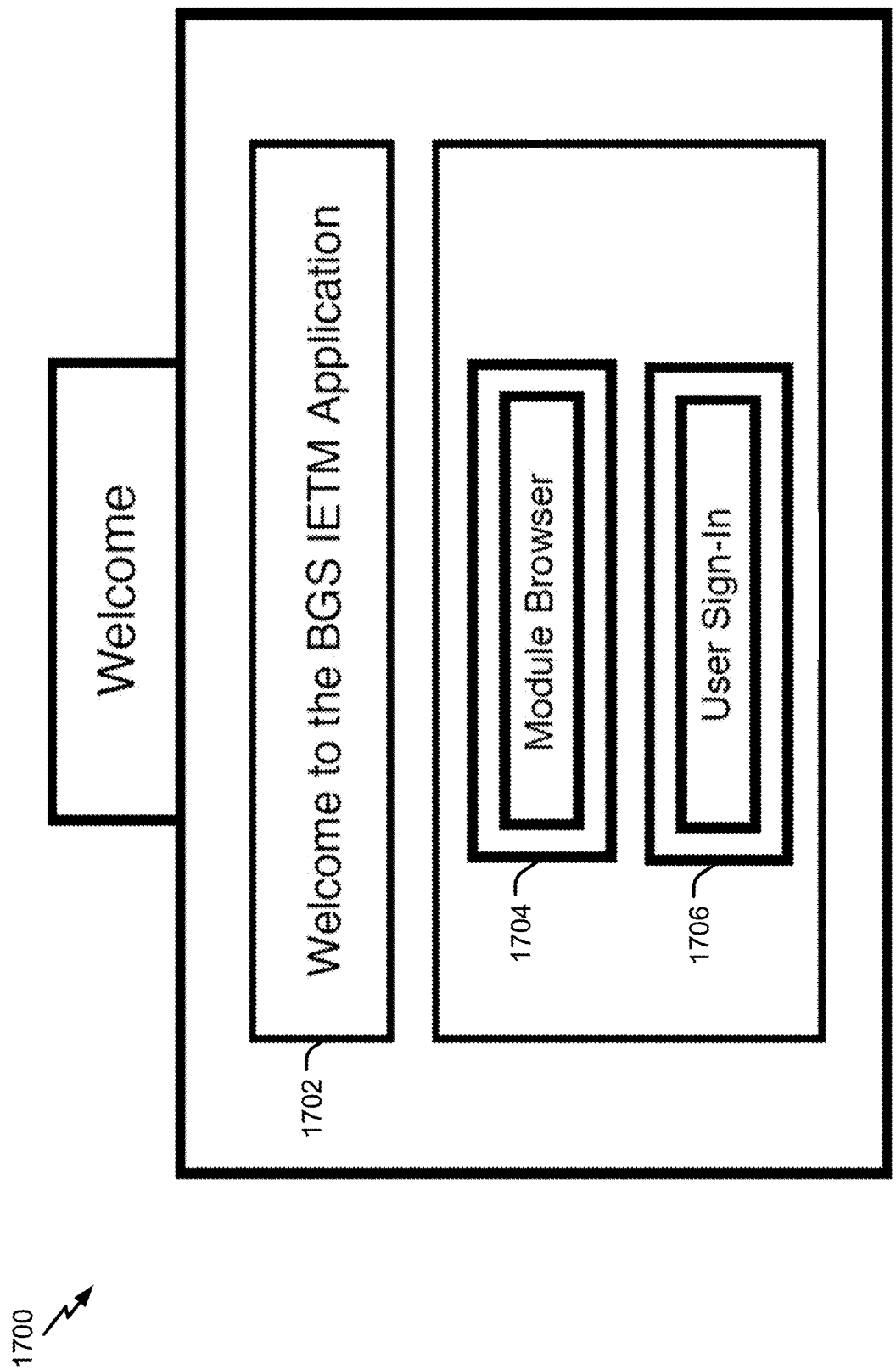
FIG. 17 is a diagram that illustrates an example of a user sign-in GUI of an AR device.

FIG. 17 illustrates a diagram of an example of a sign-in GUI 1700 of the AR device 102. In the example illustrated in FIG. 17, the sign-in GUI 1700 includes platform or technical manual identification information 1702, a module browser button 1704, and a user sign-in button 1706. The identification information 1702 identifies or indicates which technical manual or platform the user is viewing. The module browser button 1704 displays a list of modules within or corresponding to the technical manual or platform indicated by the identification information 1702. The user sign-in button 1706 is configured to enable a user to input a user ID (and optionally a password) to sign into the AR maintenance application 126 and to enable the AR device 102 to generate timestamps associated with the user ID.

Figure 18:
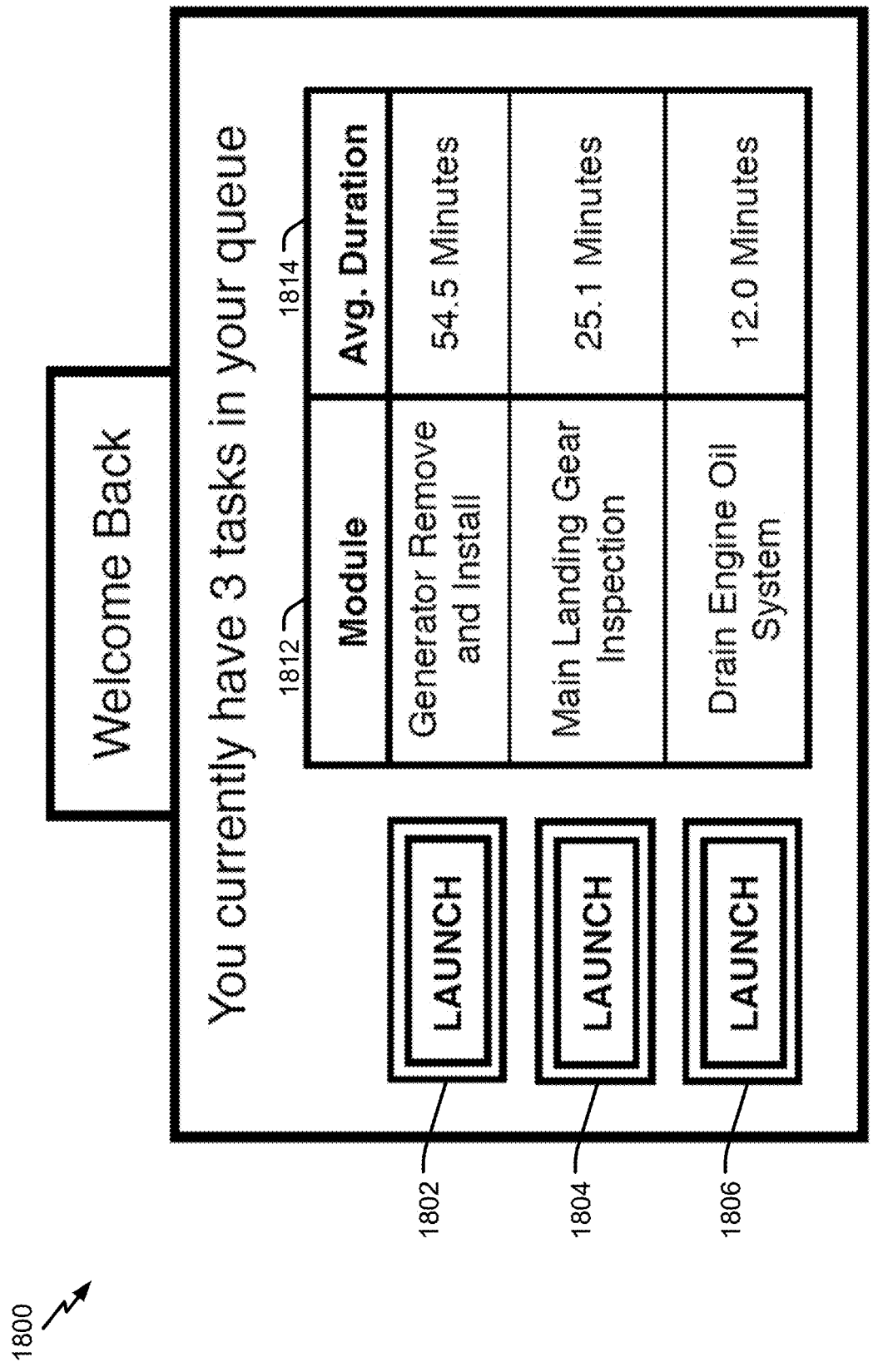
FIG. 18 is a diagram that illustrates an example of a task queue GUI of an AR device.

FIG. 18 illustrates a diagram of an example of a task queue GUI 1800 of the AR device 102. In a particular implementation, the AR device 102 outputs the task queue GUI 1800 responsive to a user signing in via the sign-in GUI 1700, saying task queue, or a combination thereof, the AR device 102.

In the example illustrated in FIG. 18, the task queue GUI 1800 includes multiple tasks buttons 1802-1806, each corresponding to a different task to be performed by the user or a group of user's. Additionally, the task queue GUI 1800 includes a module name 1812 and an average duration 1814 for each of the multiple tasks corresponding to the multiple task buttons 1802-1806.

Figure 19:
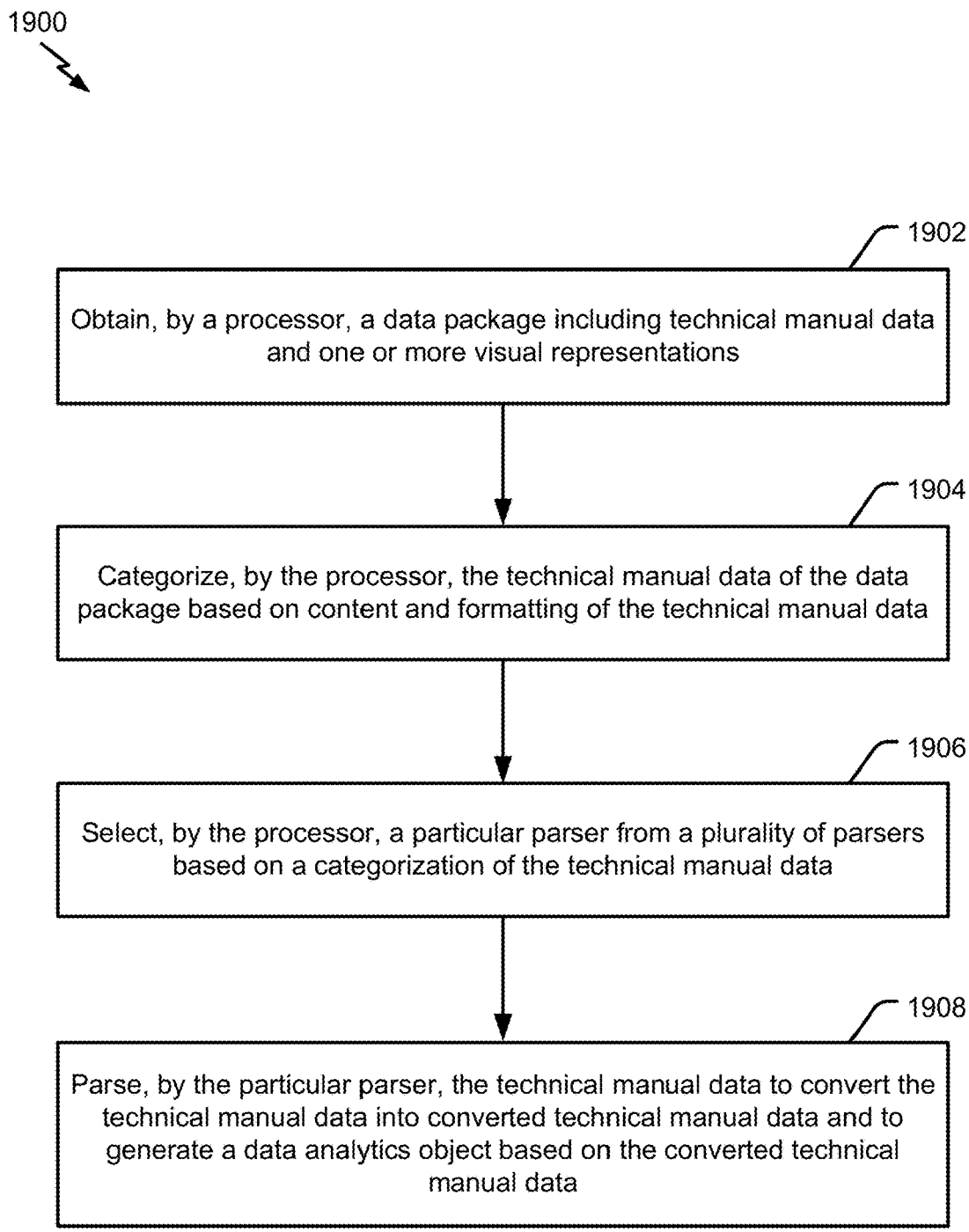
FIG. 19 is a flow chart of an example of a method of converting technical manual data.

FIG. 19 illustrates a particular example of a method 1900 of converting technical manual data, such as the technical manual data 142 of FIG. 1. The method 1900 may be performed by the system 100, the AR device 102, the processor 112, or a combination thereof. The method 1900 includes, at 1902, obtaining, by a processor, a data package including technical manual data and one or more visual representations. For example, the data package may include or correspond to the data package 132 of FIG. 1. The technical manual data may include or correspond to the technical manual data 142 of FIG. 1, and the visual representations may include or correspond to the visual representations 144 of FIG. 1. To illustrate, the processor 112 of the AR device 102 receives or retrieves the data package 132 including the technical manual data 142 and the one or more visual representations 144, as described with reference to FIG. 1.

The method 1900 also includes, at 1904, categorizing, by the processor, the technical manual data of the data package based on content and formatting of the technical manual data. For example, the processor 112 of the AR device 102 categorizes the technical manual data 142 based on content and formatting of the technical manual data 142, as described with reference to FIGS. 1 and 2. As an illustrative example, the data categorizer 212 of FIG. 2 generates the categorization data 146 of FIG. 1.

The method 1900 includes, at 1906, selecting, by the processor, a particular parser from a plurality of parsers based on a categorization of the technical manual data. For example, the categorization may include or correspond to the categorization data 146 of FIG. 1. To illustrate, the processor 112 of the AR device 102 selects a parser based on the categorization data 146, as described with reference to FIGS. 1 and 2. As an illustrative example, the conversion application 128 selects a particular parser 214 (e.g., a first parser) from the plurality of parsers 214 based on the categorization data 146.

The method 1900 further includes, at 1908, parsing, by the particular parser, the technical manual data to convert the technical manual data into converted technical manual data and to generate a data analytics object based on the converted technical manual data. For example, the converted technical manual data may include or correspond to the converted technical manual data 148, and the data analytics object may include or correspond to the data analytics object 150 of FIG. 1. To illustrate, the processor 112 of the AR device 102 parses the technical manual data 142 to convert the technical manual data 142 into converted technical manual data 148 and to generate the data analytics object 150 based on the converted technical manual data 148, as described with reference to FIGS. 1 and 2. As an illustrative example, the selected parser 214 parses the technical manual data 142 to convert the technical manual data 142 into converted technical manual data 148 and to generate the data analytics object 150 based on the converted technical manual data 148, as described with reference to FIG. 2

In some implementations, the conversion application 128 receives a second data package including updated technical manual data and converts the updated technical manual data to second converted technical manual data. The conversion application 128 compares first names, first dates, first version numbers, or a combination thereof, of the converted technical manual data to second names, second dates, second version numbers, or a combination thereof, of the second converted technical manual data. Responsive to comparing the first names, the first dates, the first version numbers, or the combination thereof to the second names, the second dates, the second version numbers, or the combination thereof, the conversion application 128 generates a link to the second converted technical manual data and inserts the link into the converted technical manual data. The link, such as version information 824, is configured to enable a user to select the converted technical manual data or the second converted technical manual data. Responsive to user selection of a maintenance module of the converted technical manual data, the AR device displays a prompt including options for selecting a first version or a second version of the maintenance module. The first version corresponds to the converted technical manual data and the second version corresponds to the second converted technical manual data.

In some implementations, the method 1900 further includes initiating transmission of the updated data analytics object to a second computer and receiving an action item from the second computer. For example, the AR device 102 updates the data analytics object 150 based on the timestamps, generates an analytics update 162 based on the updated data analytics object 150, and sends the analytics update 162 update to the second computer 106, as described with reference to FIG. 1. The action item indicates one or more remedial actions for a user associated with a particular user ID and the action item is generated based on the updated data analytics object. For example, the second computer 106 identifies that a particular user needs supervisor assistance with a particular task based on the analytics update 162 indicating that the particular user exceeds an estimated average duration on the particular task. The second computer 106 generates the action item 166 indicating supervisor assistance is needed for the particular task and sends the action item 166 to the AR device 102, as described with reference to FIG. 1.

In some implementations the method 1900 further includes generating a performance report based on the updated data analytics object. The performance report indicates performance metrics of one or more task IDs, one or more user IDs, or a combination thereof, as described with reference to FIGS. 1 and 16.

In some implementations, the method 1900 further includes one or more operations described with reference to FIG. 1, the flow chart 300 of FIG. 3, or a combination thereof. As an illustrative, non-limiting example, the method 1900 further includes de-serializing the converted technical manual data 148 and re-serializing the converted technical manual data 148.

The method 1900 of FIG. 19 may be initiated or controlled by an application-specific integrated circuit (ASIC), a processing unit, such as a central processing unit (CPU), a controller, another hardware device, a firmware device, a field-programmable gate array (FPGA) device, or any combination thereof. As an example, the method 1900 of FIG. 19 can be initiated or controlled by one or more processors, such as one or more processors included in a control system. In some implementations, a portion of the method 1900 of FIG. 19 may be combined with a second portion of the method 1900 of FIG. 19 and/or combined with one or more operations described in the flow chart 300 of FIG. 3. Additionally, one or more operations described with reference to the method 1900 of FIG. 19 may be optional and/or may be performed in a different order than shown or described. Two or more operations described with reference to the method 1900 of FIG. 19 may be performed at least partially concurrently.

Figure 20:
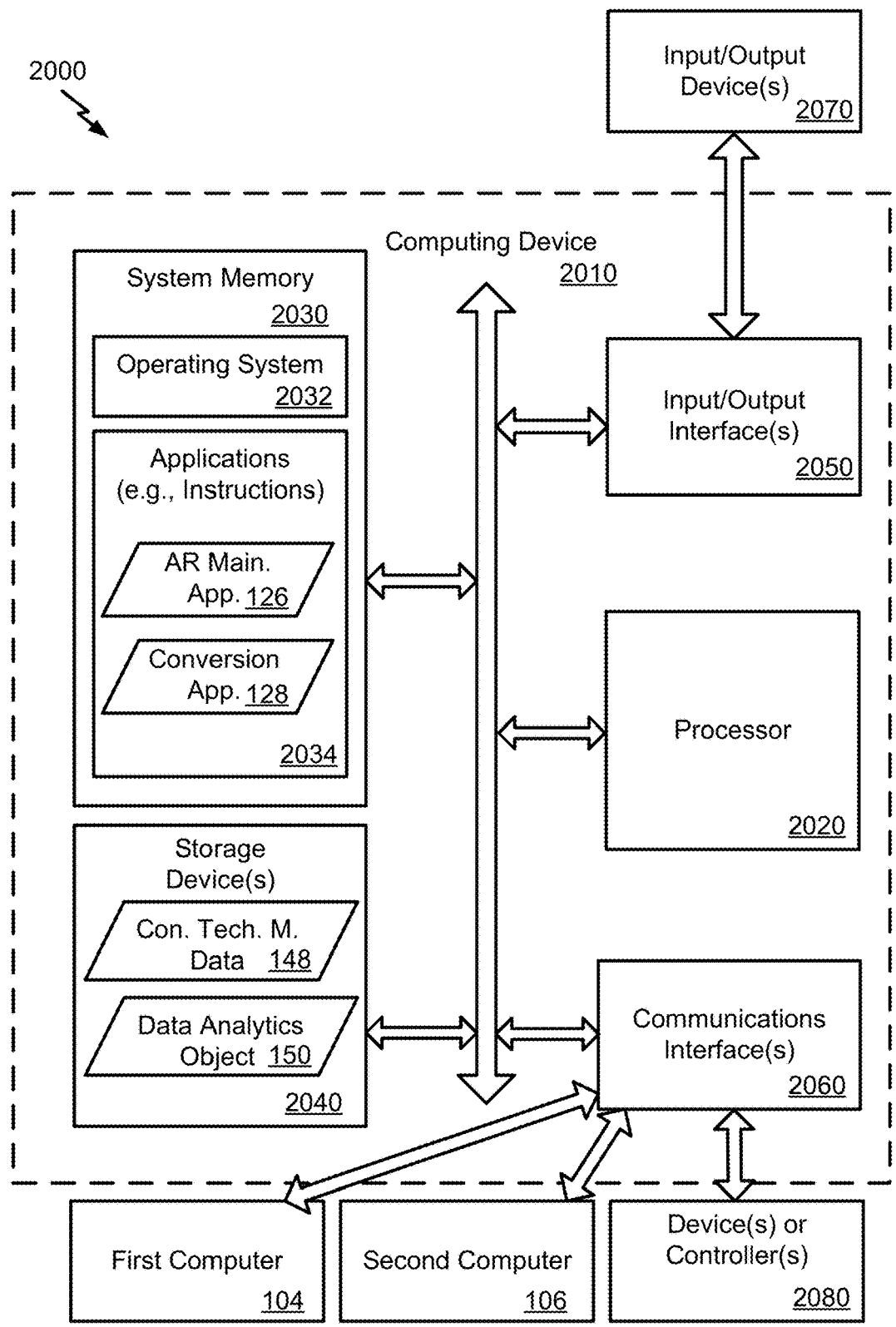
FIG. 20 is a block diagram of a particular example of a computing environment configured to support converting technical manual data according to the present disclosure.

FIG. 20 is an illustration of a block diagram of a computing environment 2000 including a general purpose computing device 2010 configured to support embodiments of computer-implemented methods and computer-executable program instructions (or code) according to the present disclosure. For example, the computing device 2010, or portions thereof, may execute instructions to perform the functions of the system 100 or functions of a portion of the system 100, such as the AR device 102, the first computer 104, or the second computer 106. The instructions to control the system 100 (or of a portion of the system 100, such as the AR device 102) may include instructions to perform operations of obtaining a data package including technical manual data and one or more visual representations. The instructions to control the system 100 (or the portion of the system 100) may also include instructions to perform operations of categorizing the technical manual data of the data package based on content and formatting of the technical manual data. The instructions to control the system 100 (or the portion of the system 100) may include instructions to perform operations of selecting a particular parser from a plurality of parsers based on a categorization of the technical manual data. The instructions to control the system 100 (or the portion of the system 100) may further include instructions to perform operations of parsing, by the particular parser, the technical manual data to convert the technical manual data into converted technical manual data and to generate a data analytics object based on the converted technical manual data. The computing device 2010, or portions thereof, may further execute instructions to perform operations according to any of the flow charts and/or methods described herein, such as the flow chart 300 of FIG. 3, the method 1900 of FIG. 19, or a combination thereof.

The computing device 2010 may include a processor 2020. The processor 2020 may communicate with the system memory 2030, one or more storage devices 2040, one or more input/output interfaces 2050, one or more communications interfaces 2060, or a combination thereof. In a particular embodiment, the processor 2020 includes or corresponds to the processor 112 of AR device 102 or the processor 112A of the first computer 104. The system memory 2030 may include volatile memory devices (e.g., random access memory (RAM) devices), nonvolatile memory devices (e.g., read-only memory (ROM) devices, programmable read-only memory, and flash memory), or both. The system memory 2030 may include an operating system 2032, which may include a basic input/output system for booting the computing device 2010 as well as a full operating system to enable the computing device 2010 to interact with users, other programs, and other devices. The system memory 2030 may include one or more applications 2034 which may be executable by the processor 2020, such as the AR maintenance application 126 and the conversion application 128. For example, the one or more applications 2034 may include instructions executable by the processor 2020 to control the system 100 to generate the converted technical manual data 148, generate the data analytics object 150, update the data analytics object 150, generate and update a GUI, or a combination thereof.

The processor 2020 may also communicate with one or more storage devices 2040, such as the memory 114 of FIG. 1. For example, the one or more storage devices 2040 may include nonvolatile storage devices, such as magnetic disks, optical disks, or flash memory devices. The storage devices 2040 may include both removable and non-removable memory devices. The storage devices 2040 may be configured to store an operating system, images of operating systems, applications, and program data. The storage devices 2040 may also store the converted technical manual data 148, the data analytics object 150, or both. In a particular embodiment, the system memory 2030, the storage devices 2040, or both, include tangible computer-readable media.

The processor 2020 may communicate with one or more input/output interfaces 2050 that enable the computing device 2010 to communicate with one or more input/output devices 2070 (such as the display 116 of FIG. 1) to facilitate user interaction. The input/output interfaces 2050 may include serial interfaces (e.g., universal serial bus (USB) interfaces or Institute of Electrical and Electronics Engineers (IEEE) 1394 interfaces), parallel interfaces, display adapters, audio adapters, and other interfaces. The input/output devices 2070 may include keyboards, pointing devices, displays, speakers, microphones, touch screens, and other devices. The processor 2020 may detect interaction events based on user input received via the input/output interfaces 2050. Additionally, the processor 2020 may send a display to a display device (e.g., the display 116) via the input/output interfaces 2050.

The processor 2020 may communicate with the first computer 104, the second computer 106, one or more devices or controllers 2080, or a combination thereof, via the one or more communications interfaces 2060. The one or more communications interfaces 2060 may include wired Ethernet interfaces, IEEE 802 wireless interfaces, other wireless communication interfaces, or other network interfaces. The one or more devices 2080 may include host computers, servers, workstations, and other computing devices.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An apparatus comprising:
a head mounted display (HMD) configured to generate sensor data indicative of user inputs;
a processor configured to communicate with the HMD; and
a memory coupled to the processor, the memory storing instructions that, when executed by the processor, cause the processor to:
obtain a data package including technical manual data and one or more visual representations;
categorize the technical manual data of the data package based on a flag of the technical manual data, a keyword of the technical manual data, a formatting of the technical manual data, a file format of the technical manual data, or a combination thereof;
select a first particular parser from a plurality of parsers based on a categorization of the technical manual data, wherein the first particular parser identifies a first attribute based on a first tag type, wherein a second particular parser of the plurality of parsers identifies a second attribute based on a second tag type, and wherein the first particular parser and the second particular parser are distinct; and
parse, by the first particular parser, the technical manual data to convert the technical manual data into converted technical manual data and to generate a data analytics object based on the converted technical manual data, and wherein the technical manual data is not parsed by the second particular parsers responsive to the first particular parser being selected.

2. The apparatus of claim 1, wherein the instructions further cause the processor to:
receive a second data package including updated technical manual data;
convert the updated technical manual data to second converted technical manual data; and
compare first entries of the converted technical manual data to second entries of the second converted technical manual data.

3. The apparatus of claim 2, wherein the instructions further cause the processor to:
responsive to comparing the first entries to the second entries, generate a link to the second converted technical manual data; and
insert the link into the converted technical manual data, the link configured to enable a user to select the converted technical manual data or the second converted technical manual data.

4. The apparatus of claim 3, wherein the instructions further cause the processor to, responsive to user selection of a maintenance module of the converted technical manual data, displaying a prompt including options for selecting a first version or a second version of the maintenance module, the first version corresponding to the converted technical manual data and the second version corresponding to the second converted technical manual data.

5. The apparatus of claim 1, wherein the instructions further cause the processor to:
generate timestamps based on user inputs; and
update the data analytics object based on the timestamps.

6. The apparatus of claim 5, wherein the instructions further cause the processor to:
initiate transmission of the updated data analytics object to a second computer; and
receive an action item from the second computer, the action item indicating one or more remedial actions for a user associated with a particular user ID, wherein the action item is based on the updated data analytics object.

7. The apparatus of claim 5, wherein the instructions further cause the processor to generate a performance report based on the updated data analytics object, the performance report indicating performance metrics of one or more task IDs, one or more user IDs, or a combination thereof.

8. The apparatus of claim 1, wherein the visual representations include two-dimensional images of an object, and further comprising retrieving three-dimensional model data from a third computer based on the two-dimensional images.

9. The apparatus of claim 1, wherein the HMD is included in an augmented reality device, wherein the converted technical manual data corresponds to an XML file and is configured to be displayed by the augmented reality device.

10. A method comprising:
obtaining, by a processor, a data package including technical manual data and one or more visual representations;
categorizing, by the processor, the technical manual data of the data package based on a flag of the technical manual data, a keyword of the technical manual data, a formatting of the technical manual data, a file format of the technical manual data, or a combination thereof;
selecting, by the processor, a first particular parser from a plurality of parsers based on a categorization of the technical manual data, wherein the first particular parser of the plurality of parsers identifies a first attribute based on a first tag type, wherein a second particular parser of the plurality of parsers identifies a second attribute based on a second tag type, and wherein the first particular parser and the second particular parser are distinct; and
parsing, by the first particular parser, the technical manual data to convert the technical manual data into converted technical manual data and to generate a data analytics object based on the converted technical manual data, and wherein the technical manual data is not parsed by the second particular parsers responsive to the first particular parser being selected.

11. The method of claim 10, wherein the data analytics object includes a task ID field, a task name field, a difficulty level field, a version field, and task log data.

12. The method of claim 11, wherein the task log data includes a user ID field, a timestamp field, and a proficiency field.

13. The method of claim 10, further comprising updating the data analytics object, wherein updating the data analytics object includes:
displaying, by a head mounted display (HMD) coupled to the processor, first task information associated with a particular task of the converted technical manual data responsive to a first user action, the particular task having a first task ID;
storing, at the data analytics object, a first timestamp responsive to displaying the first task information, the first timestamp associated with the first task ID;
responsive to receiving a second user input to advance to second task information associated with the particular task, displaying, by the HMD, the second task information; and
storing, at the data analytics object, a second timestamp responsive to displaying the second task information, the second timestamp associated with the first task ID.

14. The method of claim 10, further comprising generating a graphical user interface (GUI), wherein generating the GUI includes:
selecting a particular template from a plurality of templates based on user inputs and the converted technical manual data; and
populating the particular template based on the converted technical manual data.

15. The method of claim 14, wherein populating the particular template includes:
inserting a visual of a component into a first portion of a frame; and
inserting text corresponding to a maintenance step into a second portion of the frame.

16. The method of claim 14, wherein populating the particular template includes:
inserting a three-dimensional model of a component into a first portion of a frame;
inserting text corresponding to a maintenance step associated with the component into a second portion of the frame; and
inserting a two-dimensional image of the component into a third portion of the frame.

17. The method of claim 10, wherein parsing the technical manual data to convert the technical manual data into the converted technical manual data includes:
identifying a start and an end of modules based on the first tag type;
identifying reference links based on the second tag type;
identifying the visual representations based on a third tag type;
identifying pop-up messages based on a fourth tag type;
identifying links based on a fifth tag type;
identifying titles based on a sixth tag type;
identifying text based on a seventh tag type; and
identifying difficulty levels based on formatting.

18. A computer-readable storage device comprising instructions, that when executed, cause a processor to perform operations comprising:
obtaining a data package including technical manual data and one or more visual representations;
categorizing the technical manual data of the data package based on a flag of the technical manual data, a keyword of the technical manual data, a formatting of the technical manual data, a file format of the technical manual data, or a combination thereof;
selecting a first particular parser from a plurality of parsers based on a categorization of the technical manual data, wherein the first particular parser of the plurality of parsers identifies a first attribute based on a first tag type, wherein a second particular parser of the plurality of parsers identifies a second attribute based on a second tag type, and wherein the first particular parser and the second particular parser are distinct; and
parsing, by the first particular parser, the technical manual data to convert the technical manual data into converted technical manual data and to generate a data analytics object based on the converted technical manual data, and wherein the technical manual data is not parsed by the second particular parsers responsive to the first particular parser being selected.

19. The computer-readable storage device of claim 18, wherein the operations further comprise:
receiving a second data package including updated technical manual data,
converting the updated technical manual data to second converted technical manual data;
comparing first names, first dates, first version numbers, or a combination thereof, of the converted technical manual data to second names, second dates, second version numbers, or a combination thereof, of the second converted technical manual data;
responsive to comparing the first names, the first dates, the first version numbers, or the combination thereof, to the second names, the second dates, the second version numbers, or the combination thereof, generating a link to the second converted technical manual data;
inserting the link into the converted technical manual data, the link configured to enable a user to select the converted technical manual data or the second converted technical manual data; and
responsive to user selection of a maintenance module of the converted technical manual data, displaying a prompt including options for selecting a first version or a second version of the maintenance module, the first version corresponding to the converted technical manual data and the second version corresponding to the second converted technical manual data.

20. The computer-readable storage device of claim 18, wherein the operations further comprise:
generating note data based on user inputs, the note data indicating modifications to instructions of a particular step of the technical manual data; and
initiating transmission of an update message to a first computer, the update message including the note data and configured to cause the first computer to update the technical manual data.

\* \* \* \* \*